(12) United States Patent
Kato et al.

(10) Patent No.: US 12,401,902 B2
(45) Date of Patent: Aug. 26, 2025

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventors: Atsushi Kato, Kanagawa (JP); Hirofumi Honda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 18/173,299

(22) Filed: Feb. 23, 2023

(65) Prior Publication Data

US 2023/0283903 A1 Sep. 7, 2023

(30) Foreign Application Priority Data

Mar. 4, 2022 (JP) ................................. 2022-033774

(51) Int. Cl.
*H04N 23/62* (2023.01)
*H04N 23/69* (2023.01)

(52) U.S. Cl.
CPC ............. *H04N 23/69* (2023.01); *H04N 23/62* (2023.01)

(58) Field of Classification Search
CPC ............................... H04N 23/69; H04N 23/62
See application file for complete search history.

(56) References Cited

U.S. PATENT DOCUMENTS

| | | | |
|---|---|---|---|
| 2007/0025713 A1* | 2/2007 | Hosono | H04N 23/55 348/E5.025 |
| 2012/0062692 A1* | 3/2012 | Tsubusaki | H04N 23/635 348/36 |
| 2018/0350034 A1* | 12/2018 | Chen | G06T 3/40 |

FOREIGN PATENT DOCUMENTS

| | | |
|---|---|---|
| JP | 3387135 B2 | 3/2003 |
| JP | 2018-088624 A | 6/2018 |

* cited by examiner

*Primary Examiner* — Twyler L Haskins
*Assistant Examiner* — Surafel Yilmakassaye
(74) *Attorney, Agent, or Firm* — Cowan, Liebowitz & Latman, P.C.

(57) ABSTRACT

A control apparatus includes an optical zoom control unit configured to perform optical zoom, an electronic zoom control unit configured to perform electronic zoom, and a main control unit configured to control the optical zoom control unit and the electronic zoom control unit. The main control unit sets at least one of a start position and an end position of a first range in which the optical zoom and the electronic zoom are simultaneously performed based on a target zoom position and a specified zooming time specified by a user.

16 Claims, 18 Drawing Sheets

CONTROL APPARATUS, IMAGE PICKUP APPARATUS, CONTROL METHOD, AND STORAGE MEDIUM

BACKGROUND

Technical Field

One of the aspects of the disclosure relates to a control apparatus, an image pickup apparatus, a control method, and a storage medium.

Description of the Related Art

Some conventional image pickup apparatuses can provide optical zoom that drives a zoom lens in an optical axis direction to vary the image magnification, and electronic zoom that magnifies part of an imaging signal to vary the image magnification. A high-magnification zooming method is also known in which the electronic zoom takes over zooming after a zoom position reaches a telephoto end by the optical zoom.

Japanese Patent No. 3387135 discloses a method of providing a use range of a combination of the optical zoom and the electronic zoom in switching from the optical zoom to the electronic zoom to reduce a difference in zooming speed during the switching. Japanese Patent Laid-Open No. 2018-88624 discloses a method for shortening a zooming time by simultaneously operating the optical zoom and the electronic zoom in executing a preset function that specifies a target position (angle of view) of the zooming and a zooming time.

Japanese Patent No. 3387135 does not disclose an operation based on the specified zooming time. The method disclosed in Japanese Patent Laid-Open No. 2018-88624 can specify the zooming time, but cannot move a zoom position to a target position while maintaining a good speed change in a case where a short zooming time is specified, because the electronic zoom that is used at the telephoto end of the optical zoom is used from a wide-angle side. As a result, a specified zooming time cannot be shortened.

SUMMARY

One of the aspects of the embodiment provides a control apparatus that can shorten a specified zooming time.

A control apparatus according to one aspect of the disclosure includes at least one processor, and a memory coupled to the at least one processor, the memory having instructions that, when executed by the processor, perform operations as an optical zoom control unit configured to perform optical zoom, an electronic zoom control unit configured to perform electronic zoom, and a main control unit configured to control the optical zoom control unit and the electronic zoom control unit. The main control unit sets at least one of a start position and an end position of a first range in which the optical zoom and the electronic zoom are simultaneously performed based on a target zoom position and a specified zooming time specified by a user. An image pickup apparatus including the above control apparatus, a control method corresponding to the above control apparatus, and a storage medium storing a program that causes a computer to execute the above control method also constitute another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Referring now to the accompanying drawings, a detailed description will be given of embodiments according to the disclosure.

First Embodiment

Figure 1:
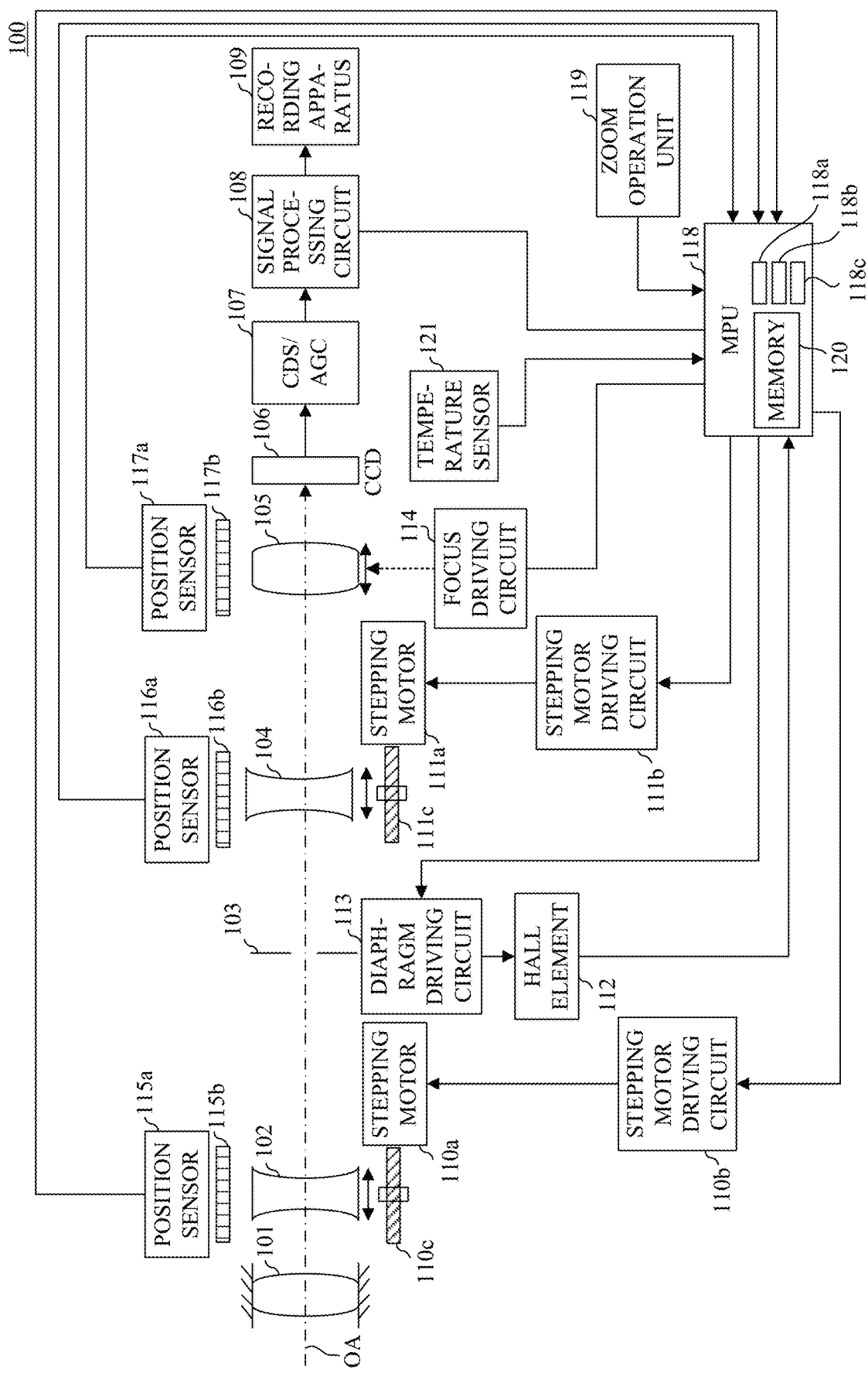
FIG. 1 is a block diagram of an image pickup apparatus according to each embodiment.

Referring now to FIG. 1, a description will be given of an image pickup apparatus according to a first embodiment of the disclosure. FIG. 1 is a block diagram of an image pickup apparatus (video camera) 100. This embodiment describes the video camera as the image pickup apparatus, but is not limited to this example, and is also applicable to other image pickup apparatuses such as a digital still camera. In the image pickup apparatus 100 according to this embodiment, the camera body and the lens apparatus are integrated, but this embodiment is not limited to this example, and the lens apparatus may be attachable to and detachable from the camera body.

The image pickup apparatus 100 includes, in order from the object side (left side in FIG. 1), a first fixed lens 101, a zoom lens 102, a diaphragm (aperture stop) 103, an auxiliary magnification-varying lens 104, and a focus lens 105. The zoom lens 102 is movable in a direction along the optical axis OA (optical axis direction) to vary the magnification (for zooming). The auxiliary magnification-varying lens 104 is movable along the optical axis according to the position of the zoom lens 102. The focus lens 105 is a focus compensator lens that has a function of correcting a focal plane fluctuation along with the magnification variation and a focusing function. The first fixed lens 101, zoom lens 102, diaphragm 103, auxiliary magnification-varying lens 104, and focus lens 105 constitute an imaging optical system.

An image sensor 106 is a photoelectric conversion element including a CCD sensor or a CMOS sensor, and photoelectrically converts an optical image (object image) formed by the imaging optical system. A corrected double sampling (CDS)/automatic gain control (AGC) circuit 107 samples image data output from the image sensor 106 and performs gain control. A signal processing circuit 108 converts an output signal from the CDS/AGC circuit 107 into a signal compatible with a recording apparatus 109, which will be described below.

A stepping motor driving circuit 110b drives a stepping motor (driving source) 110a that drives the zoom lens 102. A feed screw shaft 110c as an output shaft of the stepping motor 110a is engaged (geared) with a rack connected to the zoom lens 102. In a case where the stepping motor 110a is driven and the feed screw shaft 110c is rotated, the zoom lens 102 is moved in the optical axis direction (arrow direction in FIG. 1) due to the engagement action between the feed screw shaft 110c and the rack.

Thus, before the zoom lens 102 is driven to a target position (target zoom position) by the stepping motor 110a, first, the zoom lens 102 is set to a position (reference position) as a reference for position control after the image pickup apparatus 100 is turned on. A driving signal having the number of pulses required to move the zoom lens 102 from the reference position to the target position is input to the stepping motor 110a. Therefore, the image pickup apparatus 100 includes a position sensor (reference position sensor) 115a for detecting whether or not the zoom lens 102 is located at the reference position. In this embodiment, the position sensor 115a includes a photo-interrupter in which a light emitting element and a light receiving element are integrated. A light shielding unit provided to the lens holding frame is inserted between the light emitting element and the light receiving element of the photo-interrupter to shield light from the light emitting element to the light receiving element, and thereby whether the zoom lens 102 is located at the reference position can be detected. The light shielding unit has a shape that enables zone detection on the telephoto or wide-angle side of the zoom lens 102.

A position scale 115b for detecting the position of the zoom lens 102 is fixed to the holding frame of the zoom lens 102. A position sensor 115a is fixed at a position facing the position scale 115b in an unillustrated lens barrel. A scale pattern such as a magnetic pattern or a light reflection pattern is formed in the optical axis direction on the position scale 115b. The position sensor 115a can detect the position of the zoom lens 102 in the optical axis direction by reading a magnetic signal, a light reflection signal, or the like corresponding to the position of the position scale 115b. A detection signal from the position sensor 115a is input to a microprocessor (miroprocessing unit: MPU) 118, which will be described below, and used for the position control of the zoom lens 102.

The diaphragm 103 includes a diaphragm driving circuit 113 including an unillustrated galvanic type actuator, diaphragm blades driven to open and close by the actuator, and a position detection element (Hall element) 112 for detecting the diaphragm open/closed state. A stepping motor driving circuit 111b drives a stepping motor (driving source) 111a that drives the auxiliary magnification-varying lens 104. A feed screw shaft 111c as an output shaft of the stepping motor 111a is engaged with a rack connected to the auxiliary magnification-varying lens 104. In a case where the stepping motor 111a is driven and the feed screw shaft is rotated, the auxiliary magnification-varying lens 104 is moved in the optical axis direction (arrow direction in FIG. 1) due to the engagement action between the feed screw shaft 111c and the rack.

Thus, in a case where the auxiliary magnification-varying lens 104 is driven to the target position (target zoom position) by the stepping motor 111a, first, the auxiliary magnification-varying lens 104 is set to a position (reference position) as a reference for position control when the image pickup apparatus 100 is turned on. A driving signal with the number of pulses required to move the auxiliary magnification-varying lens 104 from the reference position to the target position is input to the stepping motor 111a. Therefore, the image pickup apparatus 100 includes a position sensor (reference position sensor) 116a for detecting whether or not the auxiliary magnification-varying lens 104 is located at the reference position. In this embodiment, the position sensor 116a includes a photo-interrupter in which a light-emitting element and a light-receiving element are integrated. A light shielding unit provided to the lens holding frame is inserted between the light emitting element and the light receiving element of the photo-interrupter to shield light from the light emitting element to the light receiving element, and thereby whether the auxiliary magnification-varying lens 104 is located at the reference position can be detected. The light shielding unit has a shape that enables zone detection on the telephoto or wide-angle side of the auxiliary magnification-varying lens 104.

A position scale 116b for detecting the position of the auxiliary magnification-varying lens 104 is fixed to the holding frame of the auxiliary magnification-varying lens 104. A position sensor 116a is fixed at a position facing the position scale 116b in the unillustrated lens barrel. A scale pattern such as a magnetic pattern or a light reflection pattern is formed in the optical axis direction on the position scale 116b. The position sensor 116a can detect the position of the auxiliary magnification-varying lens 104 in the optical axis direction by reading a magnetic signal, a light reflection signal, or the like corresponding to the position of the position scale 116b. A detection signal from the position sensor 116a is input to the MPU 118 and used for the position control of the auxiliary magnification-varying lens 104.

A focus driving circuit 114 including a driving source drives the focus lens 105 to a target position. A position scale 117b for detecting the position of the focus lens 105 is fixed to a holding frame of the focus lens 105, and a position sensor 117a is fixed at a position facing the position scale 117b. A scale pattern such as a magnetic pattern, a light reflection pattern, or the like is formed in the optical axis direction on the position scale 117b. The position sensor 117a can detect the position of the focus lens 105 in the optical axis direction by reading a magnetic signal, a light reflection signal, or the like corresponding to the position of the position scale 117b. A position sensor 117a feeds back position information to form a servo control system.

This embodiment assumes that the focus lens 105 is driven by a voice coil motor (VCM), but other types of actuators such as a DC motor or an ultrasonic motor may be used. Alternatively, a stepping motor may be used as the driving source for the focus lens 105, and the position sensor 117a and the position scale 117b attached to the focus-lens holding frame may be omitted. The position sensor 117a of the focus lens 105 is necessary to form a driving servo system using the VCM in this embodiment, and to acquire the position of the focus lens 105. On the other hand, in a case where the stepping motor is used as the driving source for the focus lens 117, the pulse count is treated as positional information.

An actuator needs to have a stopping accuracy of the driving source of the focus lens 105 higher than that of each of the zoom lens 102 and the auxiliary magnification-varying lens 104 described above. This is the accuracy necessary to correct the positions of the zoom lens 102 and the auxiliary magnification-varying lens 104, which will be described below, and may be determined according to the position sensitivities of the zoom lens 102 and the auxiliary magnification-varying lens 104, the depth of focus of the imaging optical system in the image pickup apparatus, and the like.

The MPU (control apparatus) 118 controls the entire operation of the image pickup apparatus 100 according to inputs from a zooming operation unit 119 and unillustrated switches such as a power switch and a recording switch. A memory (internal memory) 120 provided in the MPU 118 stores the positions of the telephoto end (TELE end) and the wide-angle end (WIDE end) relative to the reference position of the zoom lens 102 as position data of the zoom lens 102. The stepping motors 110a and 111a are driven according to forward and reverse signals from the MPU 118 input to the stepping motor driving circuits 110b and 111b. The focus driving circuit 114 is driven by a control signal from the MPU 118.

A temperature sensor 121 that detects the temperature of the lens barrel is connected to the analog-to-digital (A/D) conversion circuit built in the MPU 118. The magnification-varying operation of the imaging optical system and the accompanying focusing operation are performed by an electronic cam system using cam track data of the auxiliary magnification-varying lens 104 and the focus lens 105, which are commonly used in video cameras. That is, the zooming operation of the imaging optical system and the accompanying focusing operation are performed by controlling the stepping motor 111a and the focus driving circuit 114, which are the driving sources of the auxiliary magnification-varying lens 104, using the electronic cam system. The cam track data is stored in memory 120 of the MPU 118.

The memory 120 also stores the position sensitivities of the auxiliary magnification-varying lens 104 and the focus lens 105. The driving method of the stepping motor in this embodiment is not particularly limited, and for example, a 1-2 phase driving method or a 2-2 phase driving method may be used.

An electric signal (image data) output from the image sensor 106 is input to the signal processing circuit 108. The signal processing circuit 108 sends a video signal to the recording apparatus 109 from the input electric signal. The recording apparatus 109 records moving images and still images, and uses magnetic tape, semiconductor memory, and Digital Versatile Disc (DVD) as recording media.

The MPU 118 feedback-controls the actuator of the diaphragm driving circuit 113 so that the input luminance signal component always has a proper value. At this time, the output from the position detection element 112 is amplified and converted from an analog signal to a digital signal by an unillustrated A/D conversion circuit, and input as information indicating the open/closed position of the diaphragm 103 (diaphragm position information) into the MPU 118. Based on the diaphragm position information, the MPU 118 sends an opening/closing signal to the diaphragm driving circuit 113 to control the diaphragm 103 so that the luminance signal component always has a proper value. The MPU 118 can also send an open/closed signal to the diaphragm driving circuit 113 for positioning the diaphragm 103 at a predetermined open/close position.

This embodiment may include an operation member (focus operation unit) that drives the focus lens 105. At this time, the operation member sends operation information to the MPU 118, and the MPU 118 gives a driving command to the focus driving circuit 114 based on the operation information.

In this embodiment, the MPU 118 includes an optical zoom control unit 118a, an electronic zoom control unit 118b, and a control unit (main control unit) 118c. The optical zoom control unit 118a drives the zoom lens 102 to perform optical zoom for enlarging a formed image. The electronic zoom control unit 118b performs electronic zoom for enlarging an image (captured image) acquired by the image sensor 106 by electronic processing. The control unit 118c controls the optical zoom control unit 118a and the electronic zoom control unit 118b. The control unit 118c sets starting and ending magnifications of a range (first range) in which the optical zoom and the electronic zoom are simultaneously performed (used together) based on a target zoom position and specified zooming time specified by the user.

Figure 2:
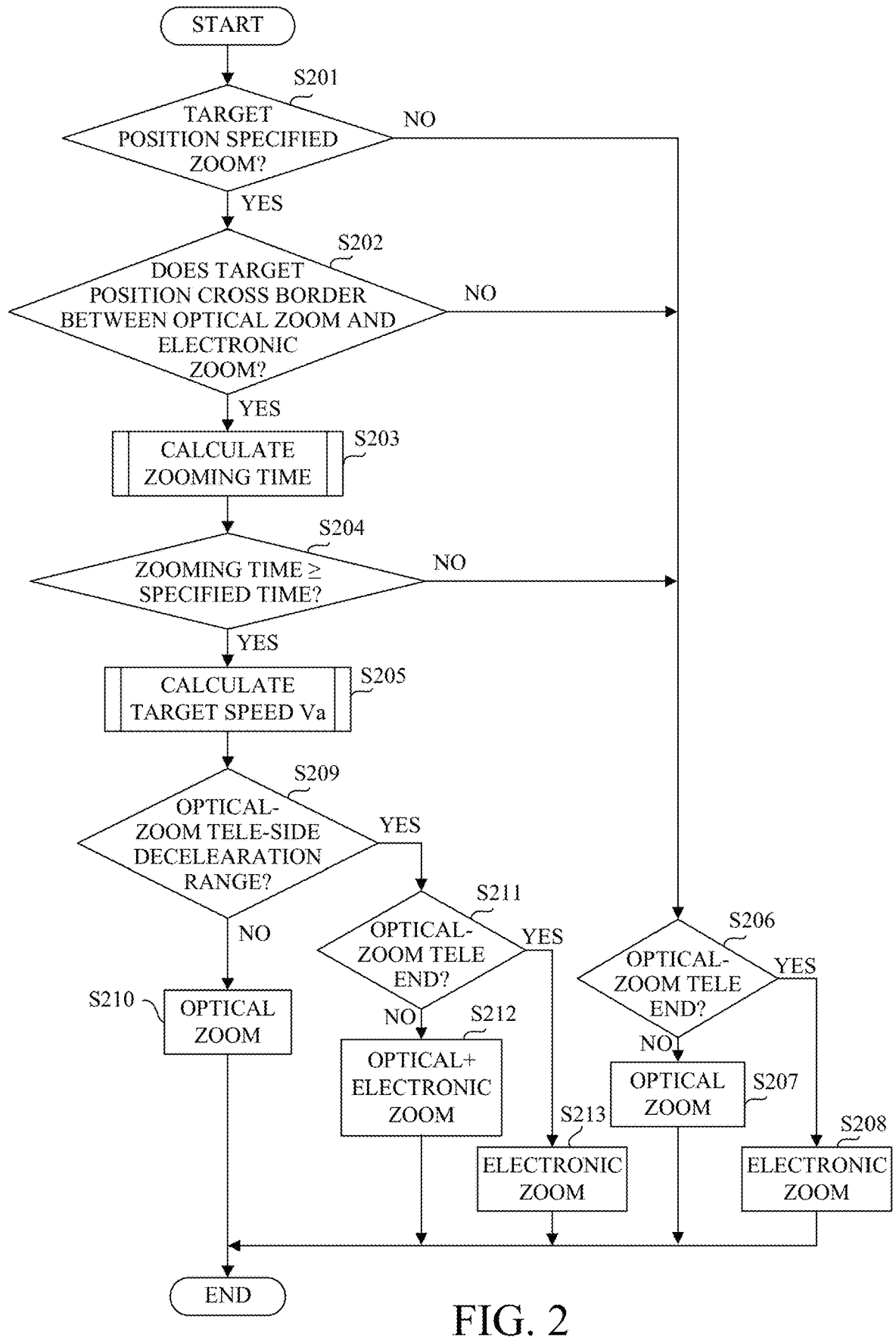
FIG. 2 is a flowchart of zoom processing according to a first embodiment.

Referring now to FIG. 2, a description will be given of zoom processing (control method) executed by the MPU 118. FIG. 2 is a flowchart of zoom processing. This embodiment uses, as the zoom method, manual zoom such as zoom key operation, and a preset function (zoom function of specifying a target position) that zooms an image by specifying a target position (angle of view) for zooming, that is, a target zoom position and a zooming time.

In starting zooming, first, in step S201, the MPU 118 determines whether or not the user has specified a target zoom position, that is, whether or not the zoom is target position specified zoom. In a case where the zoom is not the target position specified zoom, that is, in a case where the zoom sets only a driving direction or only a driving direction and a driving speed, the flow proceeds to step S206. In and subsequent to step S206, the MPU 118 performs zooming without simultaneously using the optical zoom and the electronic zoom. That is, in step S206, the MPU 118 determines whether or not the zoom position has reached the telephoto end (TELE end) of the optical zoom. In a case where the zoom position has not yet reached the TELE end of the optical zoom, the flow proceeds to step S207, where the MPU 118 performs the optical zoom. On the other hand, in a case where the zoom position has reached the TELE end of the optical zoom in step S206, the flow proceeds to step S208, where the MPU 118 switches the optical zoom to the electronic zoom and zooms an image until the zoom position reaches the target position. At this time, the speed of electronic zoom takes over the speed of optical zoom.

On the other hand, in a case where the zoom is the target position specified zoom in step S201, the flow proceeds to step S202. In step S202, the MPU 118 determines whether the target position crosses the border between optical zoom and electronic zoom based on a relationship between the target zoom position (target position) and the current zoom position. In a case where the target position does not cross the border between the optical zoom and the electronic zoom, that is, in a case where it is zooming from an optical zoom position to another optical zoom position or from an electronic zoom position to another electronic zoom position, the flow proceeds to step S206. In step S206, the MPU 118 performs zooming without simultaneously using the optical zoom and the electronic zoom. On the other hand, in a case where the target position crosses the border between the optical zoom and the electronic zoom, that is, in a case where it is zooming from an optical zoom position to an electronic zoom position or from an electronic zoom position to an optical zoom position, the flow proceeds to step S203. In step S203, the MPU 118 calculates the zooming time to the target zoom position.

Figure 3A:
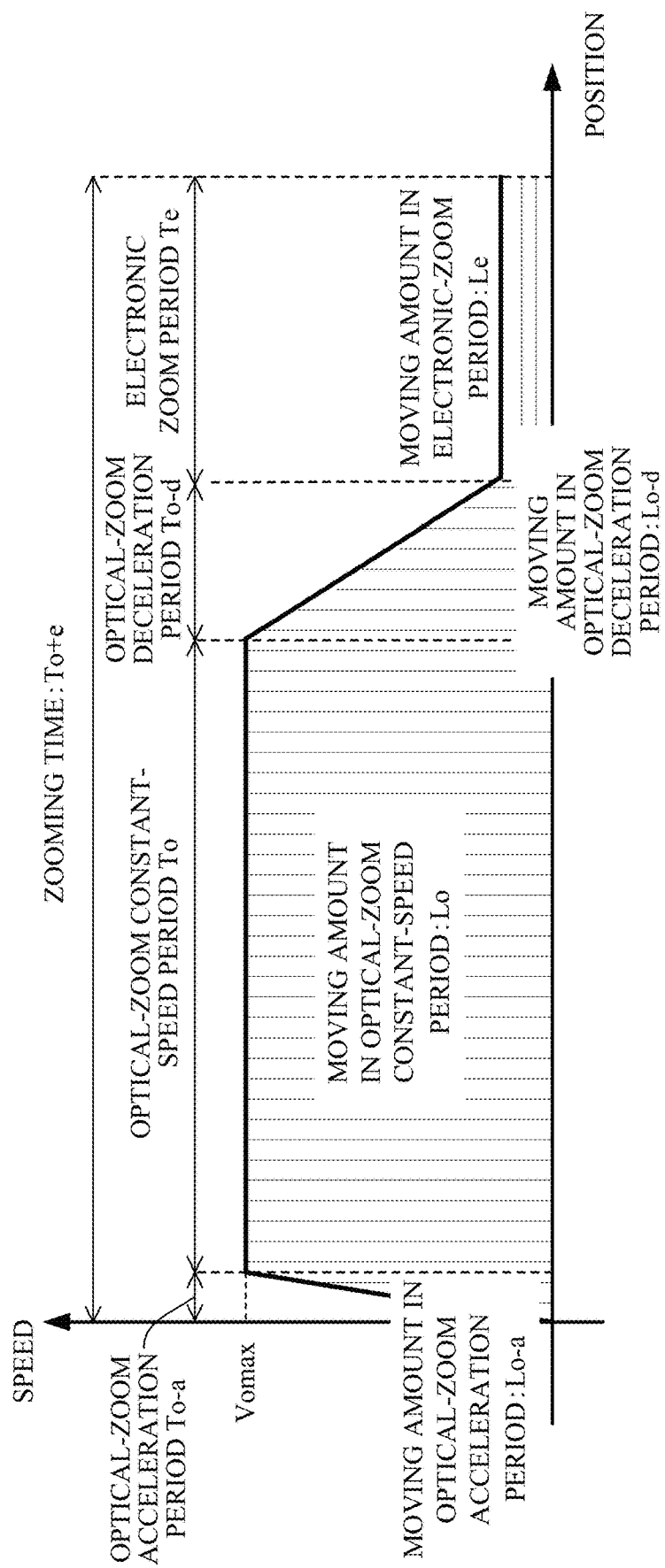
FIGS. 3A and 3B illustrate a relationship among periods, speeds, and moving amounts of optical zoom and electronic zoom according to the first embodiment.

Referring now to FIG. 3A, a description will be given of a method for calculating the zooming time. FIG. 3A illustrates a relationship among the periods, the speeds, and the moving amounts of the optical zoom and the electronic zoom, and illustrates a case where an optical zoom and electronic zoom combination (O/E) period is not provided. A vertical axis indicates a zooming speed, and a horizontal axis indicates a zoom position (zoom magnification). An optical-zoom constant-speed period To is expressed by the following equation (1):

$$To = Lo/Vo\text{max} \tag{1}$$

where Lo is a moving amount in the optical-zoom constant-speed period, and Vomax is the optical-zoom maximum speed.

An optical-zoom acceleration period To-a is expressed by the following equation (2):

$$To\text{-}a = Lo\text{-}a/Vo\text{-}a\text{-}\text{avg} \tag{2}$$

where Lo-a is a moving amount in the optical-zoom acceleration period and Vo-a-avg is an average speed in the acceleration period.

An optical-zoom deceleration period To-d is expressed by the following equation (3):

$$To\text{-}d = Lo\text{-}d/Vo\text{-}d\text{-}\text{avg} \tag{3}$$

where Lo-d is a moving amount in the optical-zoom deceleration period, and Vo-d-avg is an average speed in the deceleration period.

An electronic zoom period Te is expressed by the following equation (4):

$$Te = Le/Ve \tag{4}$$

where Le is a moving amount (angle of view changing amount) of the electronic zoom, and Ve is an electronic-zoom target speed.

From equations (1) to (4), the zooming time To+e is expressed by the following expression (5):

$$To+e = To\text{-}a + To + To\text{-}d + Te \tag{5}$$

The optical-zoom maximum speed Vomax, the average speed Vo-a-avg in the acceleration period, and the average speed Vo-d-avg in the deceleration period are values determined by optical and/or mechanical designs of the imaging optical system, and previously stored in the MPU 118, for example. The electronic-zoom target speed Ve is a speed which the electronic zoom takes over (hands over) from the optical zoom. The handover speed has a value determined by the optical and/or mechanical designs of the imaging optical system, and is previously stored in the MPU 118, for example.

As described above, once the zooming time is calculated by equations (1) to (5) in step S203 of FIG. 2, the flow proceeds to step S204. In step S204, the MPU 118 compares the calculated zooming time To+e with a specified time (specified zooming time) T and determines whether the zooming time To+e is equal to or longer than the specified time T. In a case where the zooming time To+e is shorter than the specified time T, the flow moves to step S206 and the MPU 118 performs zooming without simultaneously using the optical zoom and the electronic zoom.

On the other hand, in a case where the zooming time To+e is equal to or longer than the specified time T, the flow proceeds to step S205. In step S205, the MPU 118 calculates a target speed Va based on the target position (angle of view) and the specified time T specified by the user.

Figure 3B:
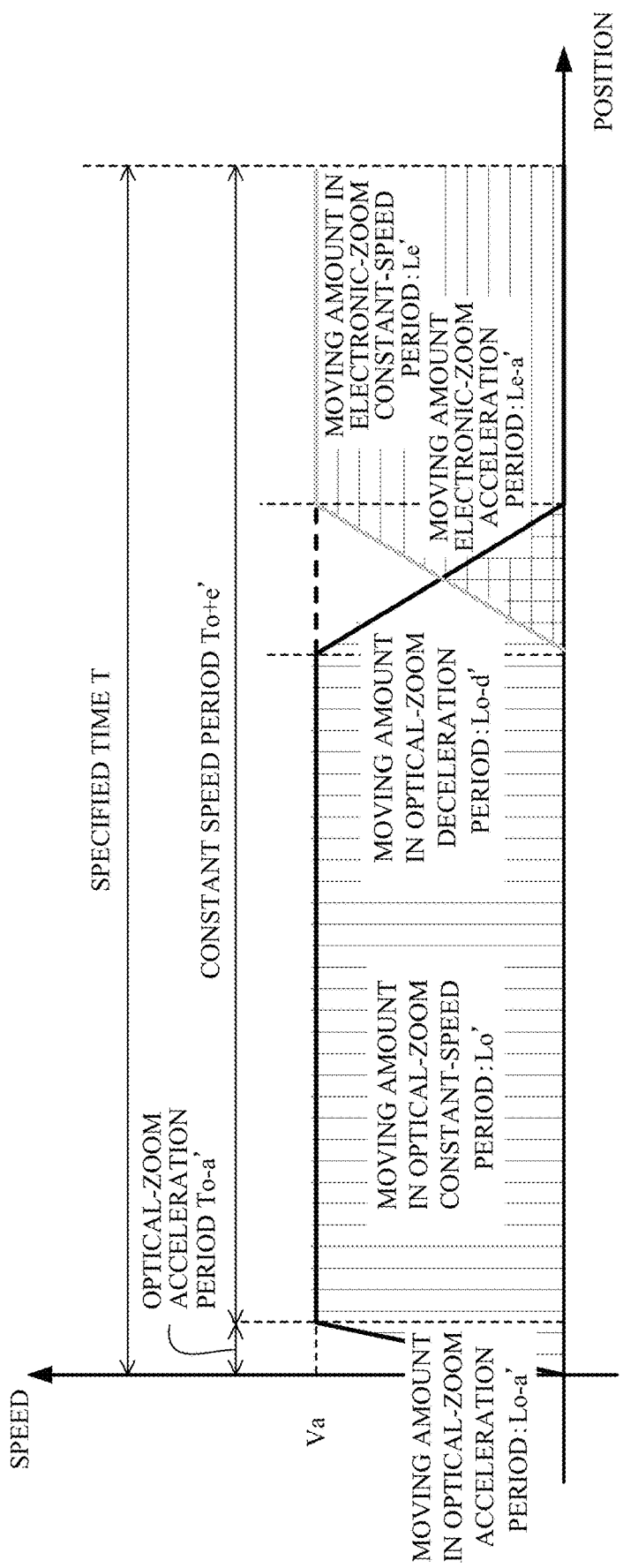

Referring now to FIG. 3B, a description will be given of a method for calculating the target speed Va. FIG. 3B illustrates a relationship among the periods, the speeds, and the moving amounts of the optical zoom and the electronic zoom in a case where the O/E period is provided (the optical zoom and the electronic zoom are operated simultaneously). As described with reference to FIG. 3A, Lo-a, Lo, and Lo-d are a moving amount in the acceleration period, a moving amount in the constant speed period, and a moving amount in the deceleration period in a case where the optical zoom is driven at the maximum speed Vomax, and Le is a moving amount in the constant speed period of the electronic zoom. Now assume that Lo-a', Lo', and Lo-d' are moving amounts in the acceleration period, the constant speed period, and the deceleration period of the optical zoom, and Le-a' and Le' are moving amounts in the acceleration period and the constant speed period of the electronic zoom at the target speed Va. Then, the following equations are established:

$$Lo' = \text{optical-zoom moving amount} - \text{acceleration-period moving amount } Lo\text{-}a' - \text{deceleration-period moving amount } Lo\text{-}d' = Lo\text{-}a + Lo + Lo\text{-}d - Lo\text{-}a' - Lo\text{-}d' \tag{6}$$

$$Le' = \text{electronic-zoom moving amount} - \text{acceleration-period moving amount} = Le - Le\text{-}a' \tag{7}$$

Since the zooming speed in the deceleration period of the optical zoom and the zooming speed in the acceleration period of the electronic zoom have a symmetrical relationship, the following equation (8) is established:

$$Lo\text{-}d' = Le\text{-}a' \tag{8}$$

From equations (6) to (8), the zoom moving amount L' in the constant speed period To+e' is expressed by the following equation (9):

$$L' = Lo' + Lo\text{-}d' + Le\text{-}a' + Le' = L - Lo\text{-}a'(L = Lo\text{-}a + Lo + Lo\text{-}d + Le) \tag{9}$$

The constant speed period To+e' is expressed by the following equation (10):

$$To+e' = T - To - a' \quad (10)$$

From equations (9) and (10), the target speed Va is expressed by the following expression (11):

$$Va = L'/To + e = (L - Lo - a')/(T - To - a') \quad (11)$$

where L and T are the zoom target position (angle of view) and the specified time specified by the user. In a case where the acceleration period To-a' and the moving amount Lo-a' in the acceleration period of the optical zoom are sufficiently small and negligible, the zoom target speed Va can be obtained by the following equation (12):

$$Va = L/T \quad (12)$$

On the other hand, in a case where the acceleration period To-a' and the moving amount Lo-a' of the optical zoom cannot be ignored, first, at the start of zooming, the target speed Va is calculated by equation (12), and acceleration to the target speed Va is performed. After the zooming speed reaches the target speed Va, the moving amount Lo-a' in the acceleration period and the acceleration period To-a' are measured, and the target speed Va is updated again by equation (11). Thereby, the zooming time can be accurately acquired.

The speed patterns of the optical zooming speed Vo-d' and the electronic zooming speed Ve-a' in the O/E period are as follows. First, the deceleration pattern of the optical zooming speed Vo-d' is determined by the optical and/or mechanical designs of the imaging optical system and previously stored, for example in the MPU 118. The electronic zooming speed Ve-a' is calculated by the following equation (13) using the target speed Va and the optical zooming speed Vo-d':

$$Ve - a' = Va - Vo - d' \quad (13)$$

In a case where the target speed Va is calculated in step S205 of FIG. 2, the MPU 118 determines the optical zoom position in steps S209 and S211. The MPU 118 then zooms an image to the target position for each determined optical zoom position using the optical zoom in step S210, the electronic zoom in step S213, and the O/E in step S212. That is, in step S210, the MPU 118 performs the optical zoom at the target speed Va until the zoom position reaches the TELE-side deceleration area of the optical zoom in step S209. In a case where the zoom position reaches the deceleration area of the optical zoom, the flow proceeds to step S211. In step S211, the MPU 118 detects whether the optical zoom position has reached the TELE end of the optical zoom. Until the optical zoom position reaches the TELE end, the MPU 118 switches to the O/E while maintaining the target speed Va in step S212. On the other hand, after the zoom position reaches the TELE end of the optical zoom, the MPU 118 switches to the electronic zoom while maintaining the target speed Va, and zooms the image to the target position.

This embodiment calculates the zooming time in zooming at the settable maximum speed in the optical zoom but is not limited to this calculation. In this embodiment, the O/E range (simultaneous operation range of the optical zoom and the electronic zoom) is a range from when the optical zoom starts decelerating on the TELE side to when the zoom position reaches the TELE end, but this embodiment is not limited to this example. For example, depending on the specified time T, the O/E may be started before the optical zoom starts decelerating, and the O/E may be performed temporarily at a higher speed than that before the O/E is started. In this embodiment, the periods other than the acceleration period To-a' of the optical zoom in the specified time T are the constant speed period To+e', but this embodiment is not limited to this example. For example, by providing an electronic-zoom deceleration period after the constant speed period To+e', zooming can be smoothly terminated. This embodiment has discussed zooming from the wide-angle side (WIDE side) to the telephoto side (TELE side), but is also applicable to zooming from the TELE side to the WIDE side. In this case, the O/E period is applied to the acceleration period from the TELE end of the optical zoom until the zooming speed of the optical zoom reaches the target speed Va.

Second Embodiment

Figure 4:
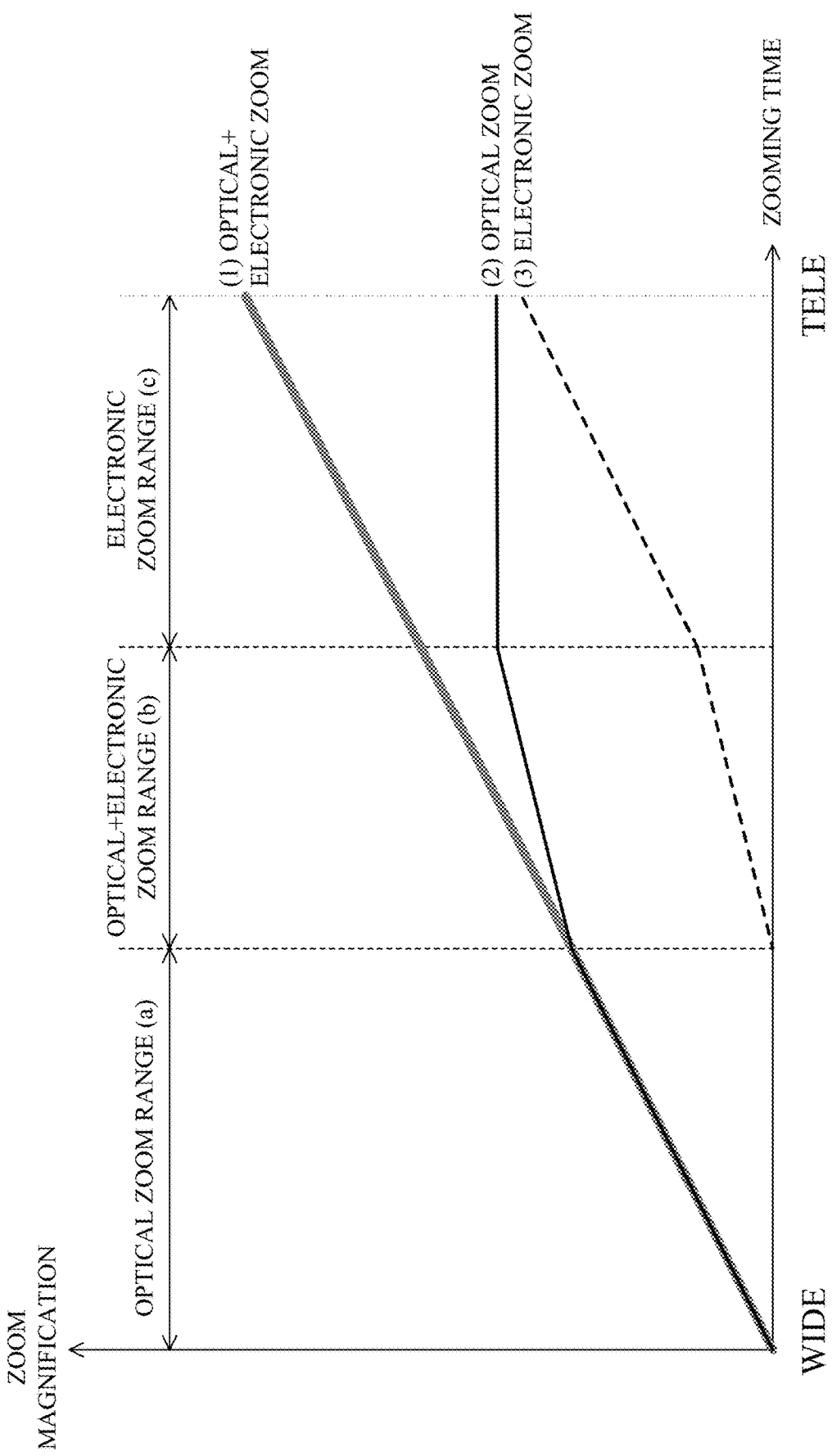
FIG. 4 explains an operation during zooming from a wide-angle end to a telephoto end according to the first embodiment.

A description will now be given of a second embodiment of the disclosure. The first embodiment shortens the zooming time while maintaining the image quality by providing a range in which the optical zoom and the electronic zoom are used together (or simultaneously performed). FIG. 4 illustrates a zooming operation example during zooming from the wide-angle end (WIDE end) to the telephoto end (TELE end) in the first embodiment. In FIG. 4, a thick line (1) indicates a zooming motion (change in angle of view) during zooming from the WIDE end to the TELE end. On the other hand, a solid line (2) and a dashed line (3) indicate an optical zooming motion and an electronic zooming motion at this time. The first embodiment provides an optical zoom range (a) (second range) and an electronic zoom range (c) (third range) as well as an O/E range (b) (first range) and thereby achieves the specified zooming time.

This embodiment will discuss a zoom resume method in a case where the time specified zoom is interrupted or terminated in the O/E range (b) in FIG. 4 in the first embodiment. In the zoom resume, the operation is switched according to the zoom condition.

Figure 5A:
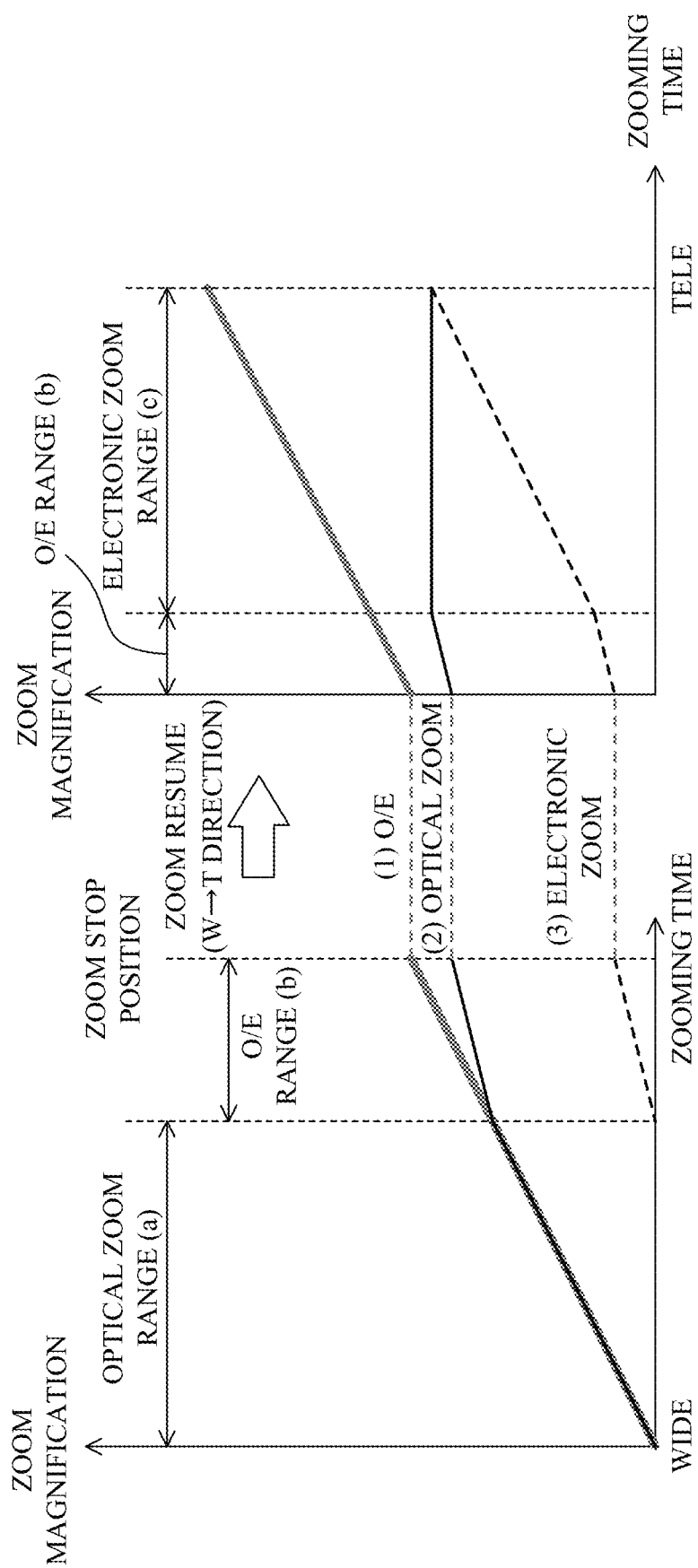
FIGS. 5A and 5B explain a zooming resume operation based on time priority according to a second embodiment.
Figure 5B:
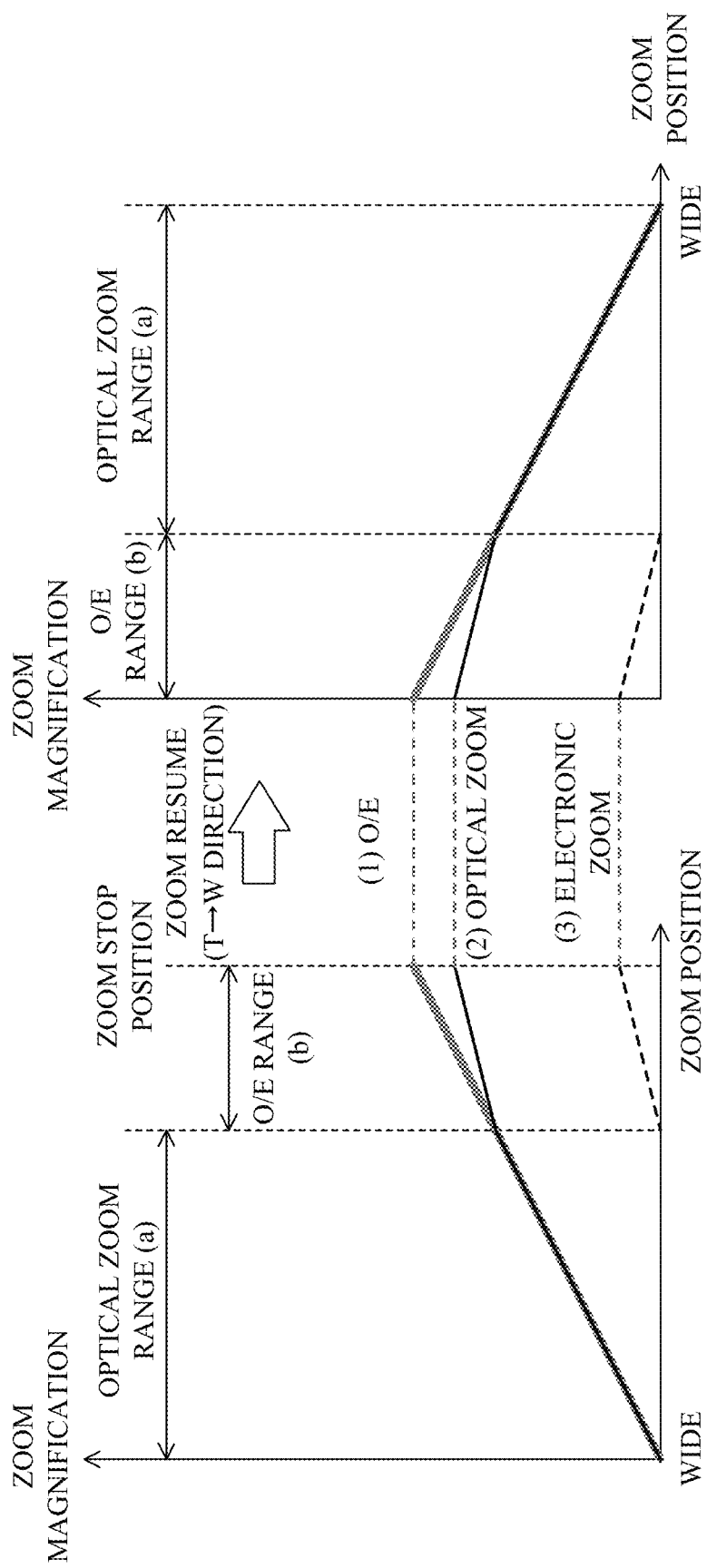

Referring now to FIGS. 5A and 5B, a description will be given of a zoom resume operation under a zoom condition of time priority. FIGS. 5A and 5B explain the zoom resume operation based on the time priority. The time priority is selected in a case where there is a time constraint due to the time specified zoom. FIG. 5A illustrates the zoom resume operation in a case where the zoom is resumed based on the time priority in the TELE direction from the O/E range (b). In this case, the zoom is resumed with the O/E similar to that before the zoom resume, and the electronic zoom takes over from the electronic zoom range (c) after the zoom position reaches the TELE end of the optical zoom, to complete the zooming. FIG. 5B illustrates the zoom resume operation in a case where the zoom is resumed based on the time priority in the WIDE direction from the O/E range (b). In this case as well, the zoom is resumed with the O/E similar to that before the zoom resume, and the optical zoom takes over from the optical zoom range (a) outside the electronic zoom range, to complete the zooming.

Figure 6A:
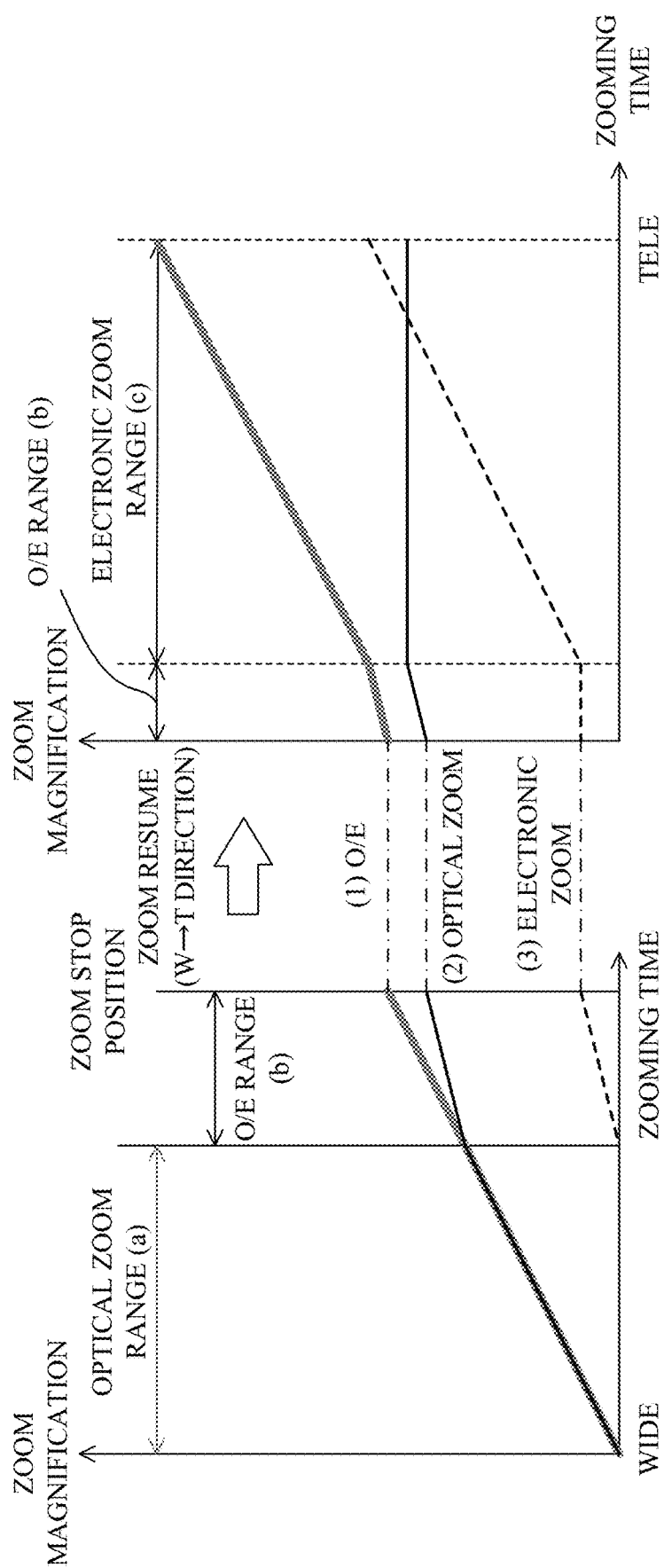
FIGS. 6A and 6B explain a zooming resume operation based on image quality priority according to the second embodiment.
Figure 6B:
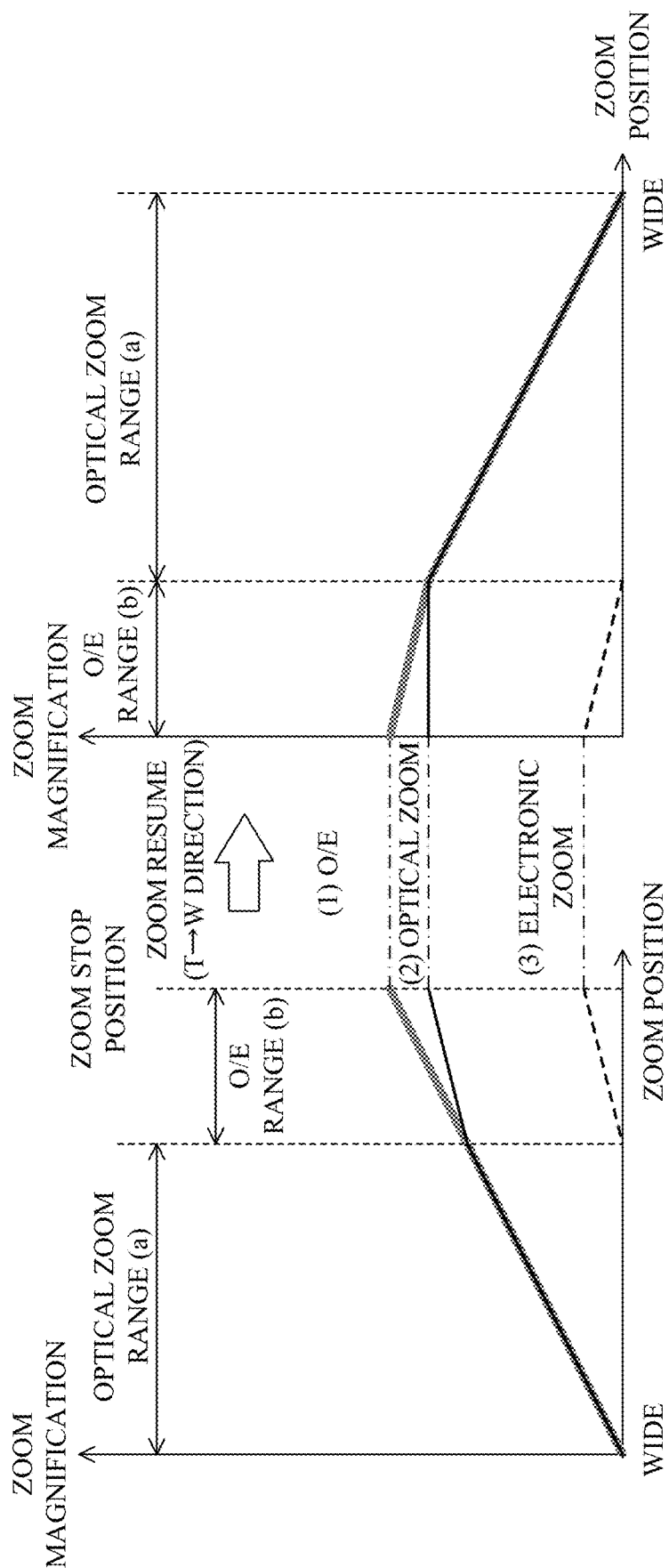

FIGS. 6A and 6B explain the zoom resume operation under a zoom condition of image quality priority. In a manual zoom condition such as zoom key operation, there is no time constraint, and thus the image quality priority is selected. FIG. 6A illustrates the zoom resume operation in a case where zooming is resumed based on the image quality priority in the TELE direction from the O/E range (b). Although this range is the O/E range (b), only the optical zoom is used for zooming, and the electronic zoom that causes image quality deterioration is avoided (that is, the O/E period is not provided). However, at this time, since the angle of view becomes discontinuous if the electronic zoom is canceled, an enlargement ratio of the electronic zoom is maintained. From the electronic zoom range (c) after the zoom position reaches the TELE end of the optical zoom, the electronic zoom takes over to complete the zooming. FIG. 6B illustrates the zoom resume operation in a case where the zoom is resumed from the O/E range (b) in the WIDE direction based on the image quality priority. Although this range is the O/E range (b), only the electronic zoom is used for zooming so as to escape from the electronic zoom range that causes the image quality deterioration as soon as possible. From the optical zoom range (a) outside the electronic zoom range, the optical zoom takes over to complete the zooming.

This embodiment is realized with the same configuration as that illustrated in FIG. 1 of the first embodiment. The O/E processing by the MPU 118 can be achieved by adding steps S701 and S702 illustrated in FIG. 7 to the flowchart illustrated in FIG. 2.

Figure 7:
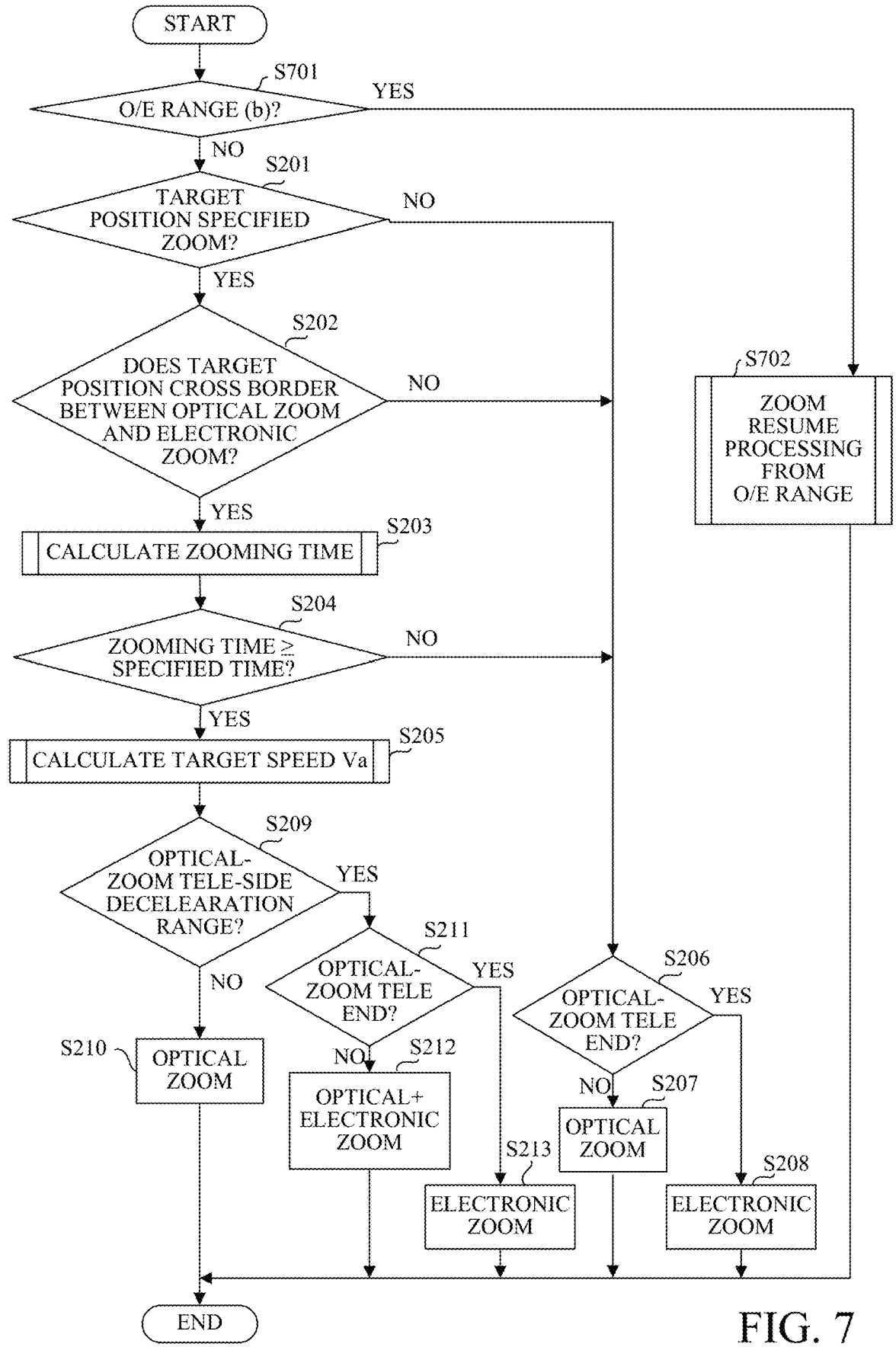
FIG. 7 is a flowchart illustrating zoom processing according to the second embodiment.
Figure 8A:
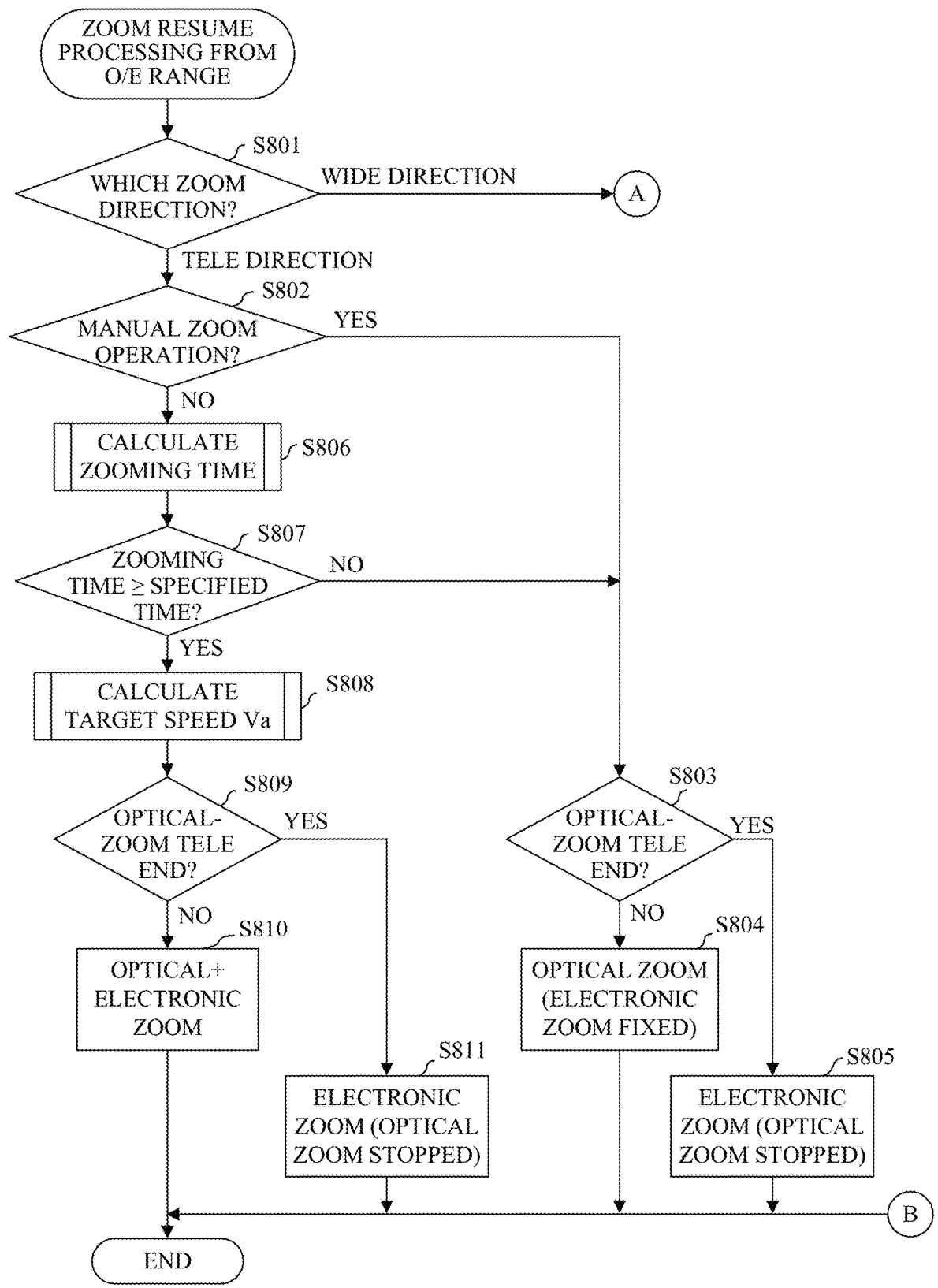
FIGS. 8A and 8B illustrate a flowchart of zoom start processing from an optical zoom and electronic zoom combination (O/E) range according to the second embodiment.
Figure 8B:
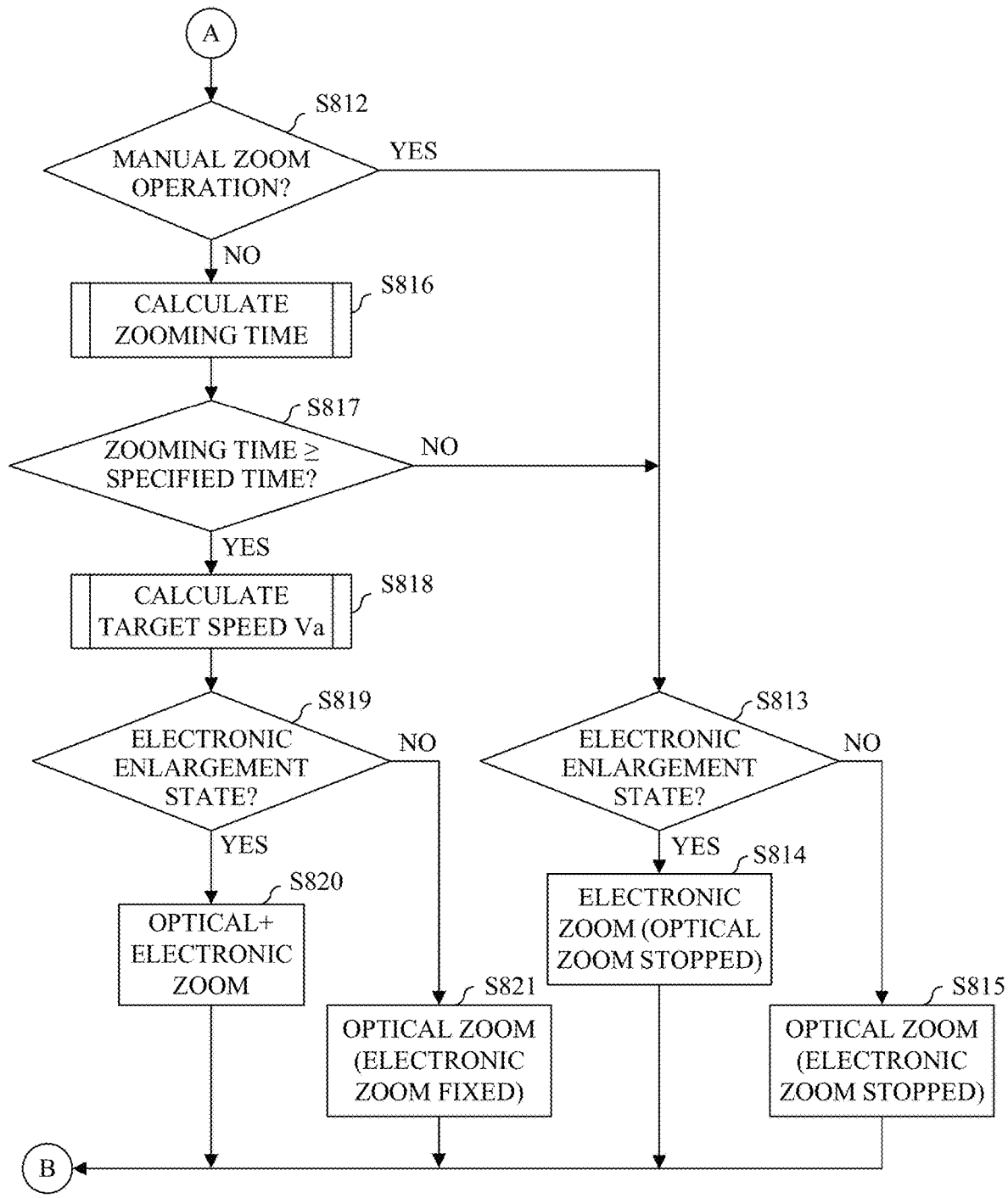

Referring now to FIGS. 5A to 8B, a description will be given of the processing of the MPU 118. FIG. 7 is a flowchart illustrating zoom processing according to this embodiment. FIGS. 8A and 8B illustrate a flowchart of the zoom start processing from the O/E range.

In the O/E processing, first, in step S701, the MPU 118 determines whether or not the last zoom was stopped in the O/E range (b). In a case where it is determined in step S701 that the last zoom was not stopped in the O/E range (b), the MPU 118 executes the processing of steps S201 to S213 in FIG. 2 described in the first embodiment.

On the other hand, in a case where it is determined in step S701 that the last zoom was not stopped in the O/E range (b), the flow proceeds to step S702. In step S702, the MPU 118 performs zoom resume processing from the O/E range (b), which is one characteristic of this embodiment. The processing of step S702 is illustrated in the flowchart of FIGS. 8A and 8B.

In the zoom resume processing from the O/E range, the processing changes depending on the zooming direction. First, in step S801, the MPU 118 determines the zooming direction. In a case where the zooming direction is the TELE direction, the flow proceeds to step S802. In step S802, the MPU 118 determines whether the zoom was performed by the manual zooming operation. In a case where it is determined that the zoom was performed by the manual zooming operation, the flow proceeds to step S803 to select the zooming operation based on the image quality priority described with reference to FIGS. 6A and 6B. That is, in a case where it is determined in step S803 that the zoom position has not reached the TELE end of the optical zoom, the flow proceeds to step S804. In step S804, the MPU 118 operates only the optical zoom while fixing the enlargement ratio of the electronic zoom. Thereby, the image quality deterioration in the O/E range (b) will not get worse. After it is determined in step S803 that the zoom position has reached the TELE end of the optical zoom, in step S805, the MPU 118 switches from the optical zoom to the electronic zoom, and continues zooming to the target position. At this time, the speed of the electronic zoom takes over the speed of the optical zoom.

On the other hand, in a case where it is determined in step S802 that the zooming operation was started not by the manual zooming operation but by time specified zooming, the flow proceeds to step S806. In step S806, the MPU 118 calculates the zooming time To+e. The zooming time To+e is calculated by calculation processing similar to that of equations (1) to (5) described in the first embodiment. Next, in step S807, the MPU 118 compares the calculated zooming time To+e with the specified time T, and determines whether the zooming time To+e is equal to or longer than the specified time T. In a case where the zooming time To+e is shorter than the specified time T, the flow proceeds to step S803, and the MPU 118 performs the zooming operation based on the image quality priority. On the other hand, in a case where the zooming time To+e is equal to or longer than the specified time T, the flow proceeds to step S808, where the MPU 118 calculates the target speed Va from the position (angle of view) and the specified time T specified by the user using the zoom preset function or the like. The target speed Va is calculated by calculation processing similar to that of equations (6) to (13) described in the first embodiment.

In a case where the target speed Va is calculated in step S808, the flow proceeds to steps S809 to S811, and the MPU 118 implements the zooming operation described with reference to FIG. 5A. That is, in the O/E period (b), first, the flow proceeds to step S810, where the MPU 118 uses the optical zoom and the electronic zoom together to resume zooming at target speed Va. In a case where it is determined in step S809 that the zoom position has reached the TELE end of the optical zoom, the MPU 118 shifts the processing to step S811, switches the optical zoom to the electronic zoom while maintaining the target speed Va, and continues zooming to the target position (angle of view).

A description will now be given of a zooming operation in the WIDE direction. In a case where it is determined in step S801 that the zooming direction is the WIDE direction, the flow proceeds to step S812. In step S812, the MPU 118 determines whether the zoom was performed by the manual zooming operation. In a case where it is determined that the zoom was performed by the manual zooming operation, the flow proceeds to step S813. In step S813, the MPU 118 selects zooming operation based on the image quality priority described with reference to FIGS. 6A and 6B. That is, in a case where the MPU 118 detects a state in which the electronic enlargement is set in step S813, the flow proceeds to step S814. In step S814, the MPU 118 operates the electronic zoom while stopping the optical zoom. Thereby, the MPU 118 performs zooming giving priority to cancellation of the electronic enlargement state. In a case where the electronic zoom is canceled in step S813, the flow proceeds to step S815, where the MPU 118 switches from the electronic zoom to the optical zoom and continues zooming to the target position (angle of view).

On the other hand, in a case where it is determined in step S812 that the zooming operation was resumed by the time specified zoom instead of the manual zooming operation, the flow proceeds to step S816. In step S816, the MPU 118 calculates the zooming time To+e. The zooming time To+e is calculated by calculation processing similar to that of equations (1) to (5) described in the first embodiment. Next, in step S817, the MPU 118 compares the calculated zooming time To+e with the specified time T, and determines whether the zooming time To+e is equal to or longer than the specified time T. In a case where the zooming time To+e is shorter than the specified time T, the flow proceeds to step S813, and the MPU 118 performs the zooming operation based on the image quality priority. On the other hand, in a case where the zooming time To+e is equal to or longer than the specified time T, the flow proceeds to step S818, where the MPU 118 calculates the target speed Va from the position (angle of view) and the specified time T specified by the user using the zoom preset function or the like. The target speed Va is calculated by calculation processing similar to that of equations (6) to (13) described in the first embodiment.

In a case where the target speed Va is calculated in step S818, the flow proceeds to steps S819 to S821, and the MPU 118 implements the zooming operation described with reference to FIG. 5A. That is, in the O/E period (b), the flow first proceeds to step S820, where the MPU 118 uses both the optical zoom and the electronic zoom to resume zooming at the target speed Va. In a case where it is detected in step S819 that the electronic enlargement has been canceled, the flow proceeds to step S821, where the MPU 118 switches from the electronic zoom to the optical zoom and continues zooming to the target position (angle of view).

In this embodiment, the determination condition for the image quality priority includes the manual zooming operation that has no time restrictions and the zooming time shorter than the specified time, but ongoing imaging may be added to this condition. In this case, it is necessary to take measures such as canceling the time restriction during imaging or limiting the specified time. In the case of the time specified zoom, the zoom is resumed with the O/E, but in the case of the manual zoom that has no time restrictions, the zooming method is changed so that the optical zoom is actively used. Therefore, the zoomed image has less deteriorated image quality.

Third Embodiment

A description will now be given of a third embodiment of the disclosure. In the second embodiment, the O/E range (b) in the first embodiment is a range having image quality deterioration. On the other hand, in this embodiment, the O/E range is classified into an O/E range (b) having image quality deterioration and an O/E range (b') having no image quality deterioration.

A description will now be given of an enlarged area of the electronic zoom that does not cause image quality deterioration. The electronic zoom is a zooming method that varies the magnification by cutting out part of an image acquired by the image sensor 106 and by electronically enlarging it. In this case, unless the number of pixels in the cutout is lower than the resolution, image quality degradation does not occur. For example, in a case where a 1920×1080 imaging resolution is selected with an image sensor with 3840×2160 pixels, the required number of pixels is maintained up to a cutout size of 1920×1080, so the image quality does not deteriorate. In a case where the cutout size is made smaller than 1920×1080, the required number of pixels cannot be maintained, and the image quality will deteriorate.

Figure 9A:
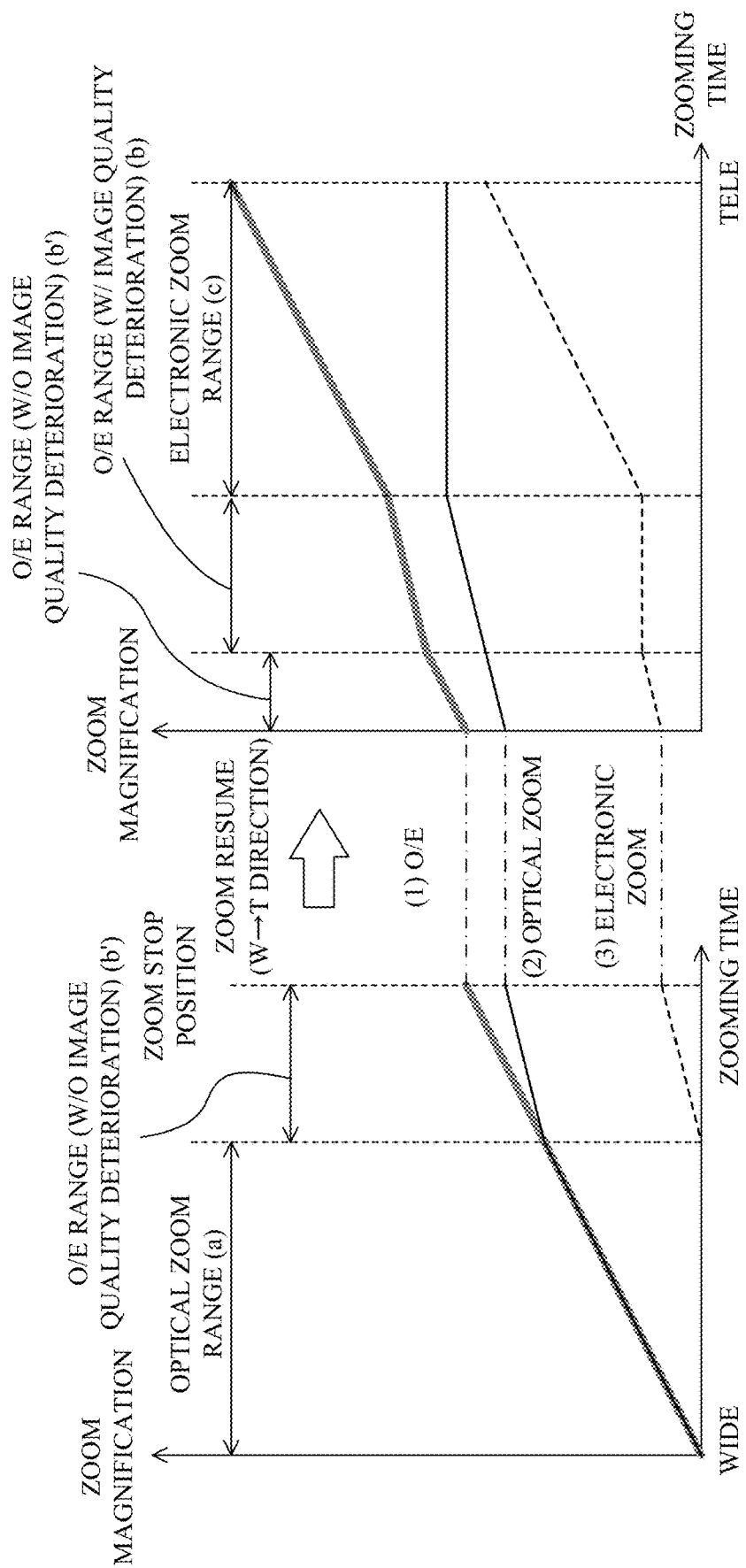
FIGS. 9A and 9B explain a zooming resume operation based on image quality priority from a range having no image quality deterioration according to a third embodiment.
Figure 9B:
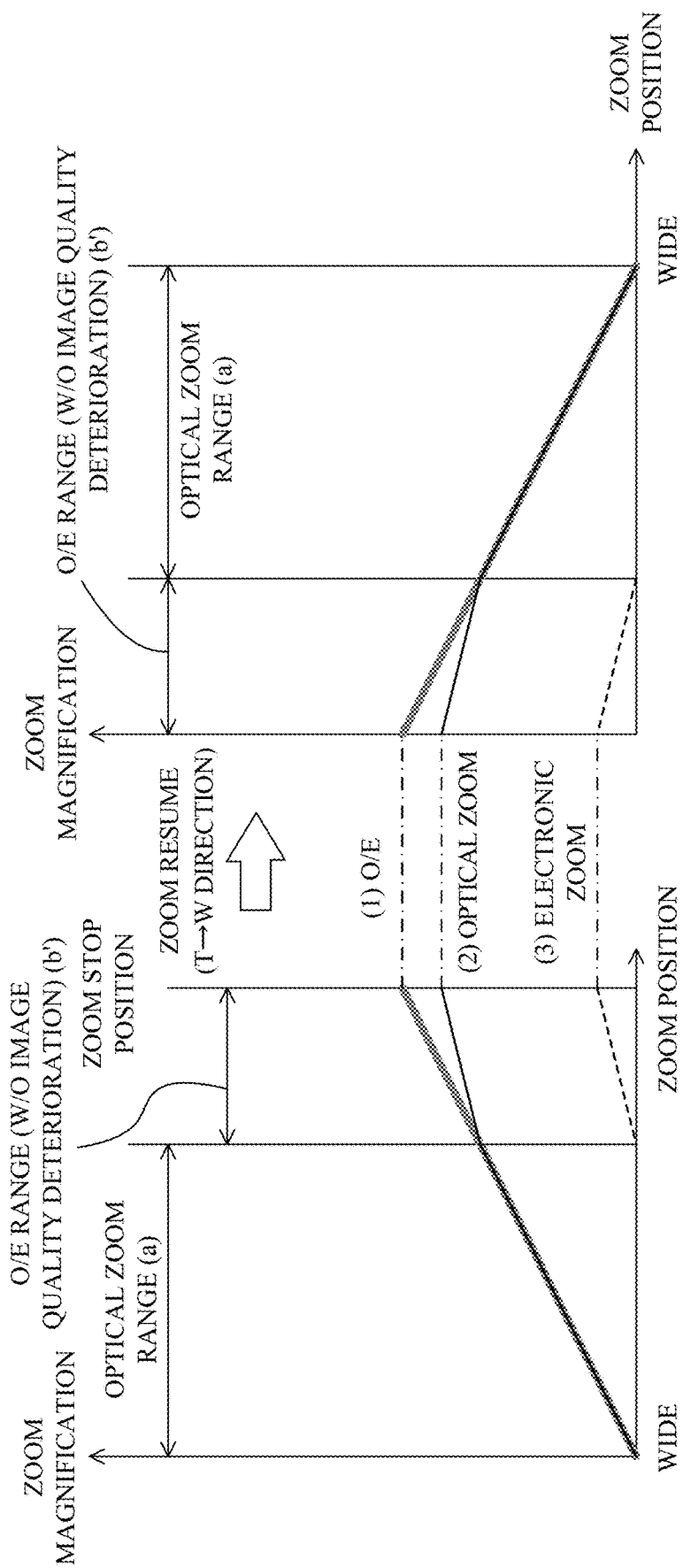

FIGS. 9A and 9B explain a zoom resume method based on the image quality priority in a case where the time specified zoom is interrupted or terminated in the O/E range (b') where the image quality is not deteriorated by electronic enlargement. FIG. 9A illustrates the zoom resume operation in a case where the zoom is resumed in a TELE direction from the O/E range (b'). In this case, the zoom resumes with the O/E. As long as the image quality does not deteriorate, the O/E is maintained, and in a range where the image quality deteriorates, the electronic zoom that causes image quality deterioration is avoided (that is, using the optical zoom and the electronic zoom together is stopped). At this time, since the angle of view becomes discontinuous if the electronic zoom is canceled, the enlargement ratio of the electronic zoom is maintained. From the electronic zoom range (c) after the zoom position reaches the TELE end of the optical zoom, the electronic zoom takes over to complete the zooming. FIG. 9B illustrates the zoom resume operation in a case where the zoom is resumed in a WIDE direction from the O/E range (b'). In this case, the zoom is resumed with the O/E. In a case where the O/E state is maintained and the electronic enlargement state ends and the zoom position enters the optical zoom range (a), the optical zoom takes over to complete the zooming.

Figure 10A:
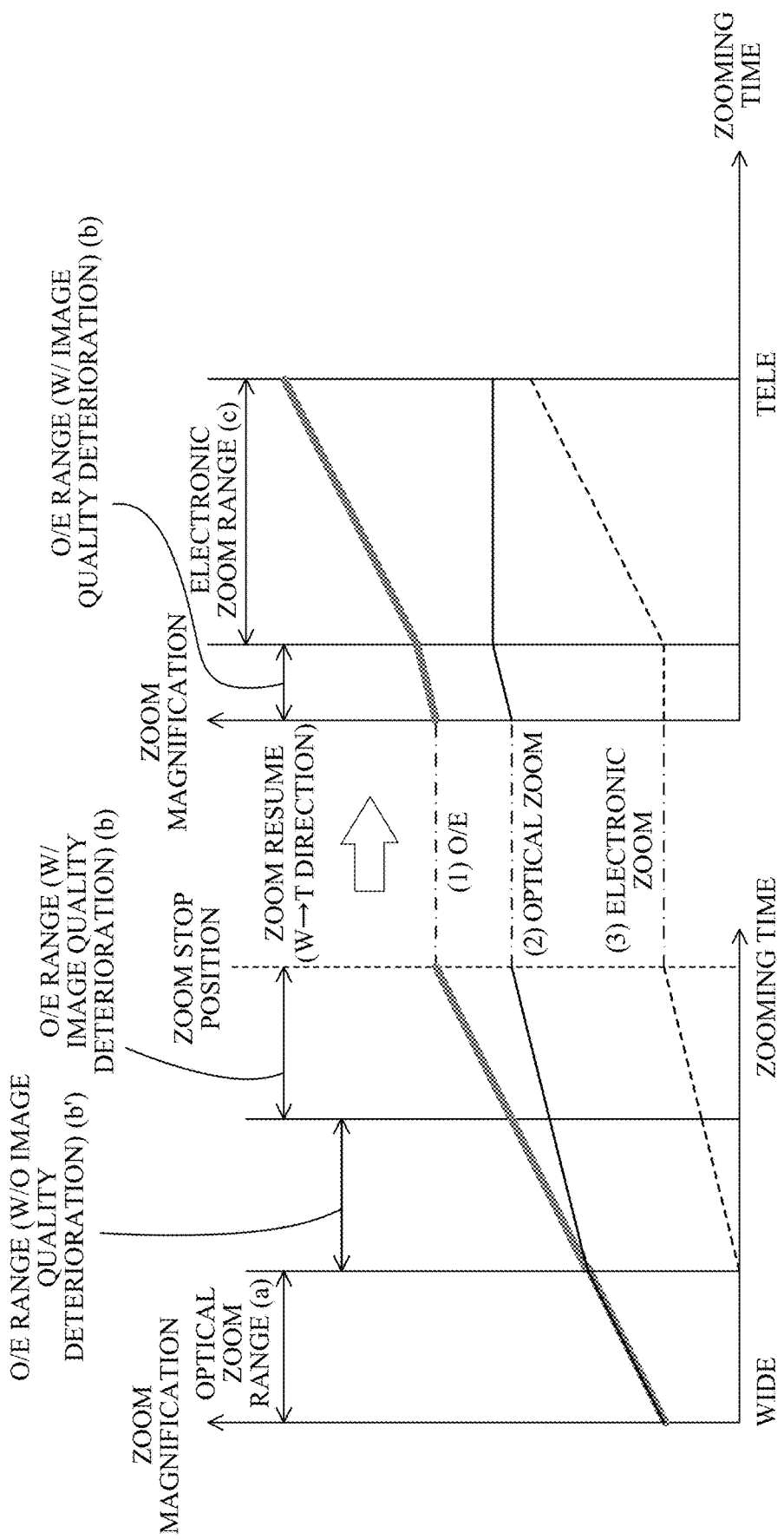
FIGS. 10A and 10B explain a zooming resume operation based on image quality priority from a range having image quality deterioration according to the third embodiment.
Figure 10B:
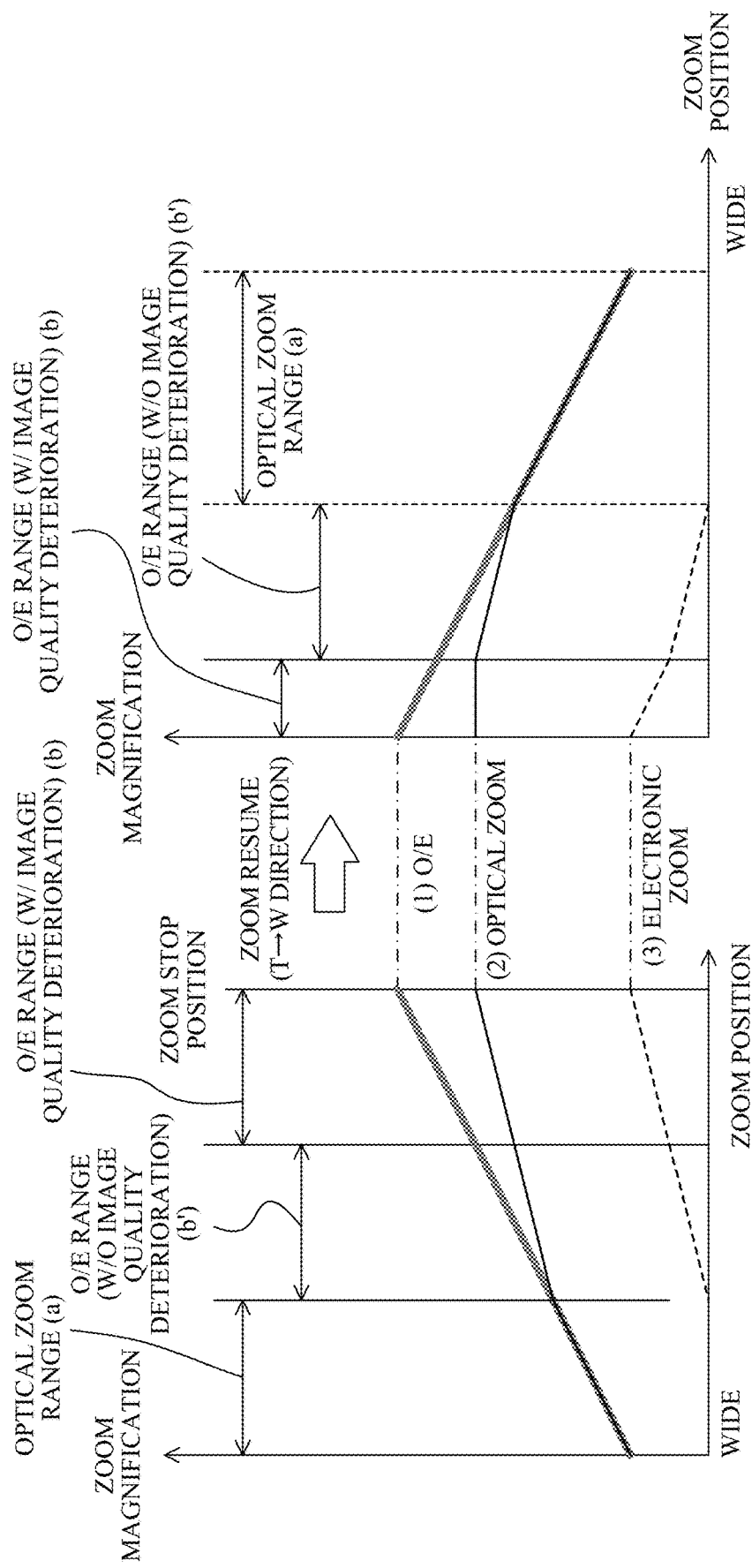

FIGS. 10A and 10B explain a zoom resume method based on the image quality priority in a case where the time specified zoom is interrupted or terminated in the O/E range (b) where image quality deterioration occurs due to electronic enlargement. FIG. 10A illustrates a zoom resume operation in a case where the zoom is resumed in the TELE direction from the O/E range (b). In this case, the optical zoom is used for zooming and the electronic zoom that causes the image quality deterioration is avoided (that is, no O/E period is provided). At this time, since the angle of view becomes discontinuous if the electronic zoom is canceled, the enlargement ratio of the electronic zoom is maintained. From the electronic zoom range (c) after the zoom position reaches the TELE end of the optical zoom, the electronic zoom takes over to complete the zooming. FIG. 10B illustrates the zoom resume operation in a case where the zoom is resumed in the WIDE direction from the O/E range (b). In this case, only the electronic zoom is used for zooming so as to escape from the electronic zoom range that causes the image quality deterioration as soon as possible. The O/E takes over from the O/E range (b') outside the electronic zoom range that causes the image quality deterioration, the optical zoom takes over from the optical zoom range (a) outside the electronic zoom range, and the zooming is completed. At this time, the O/E range (b') may be moved based on the electronic zoom priority without using both the optical zoom and the electronic zoom.

Figure 11A:
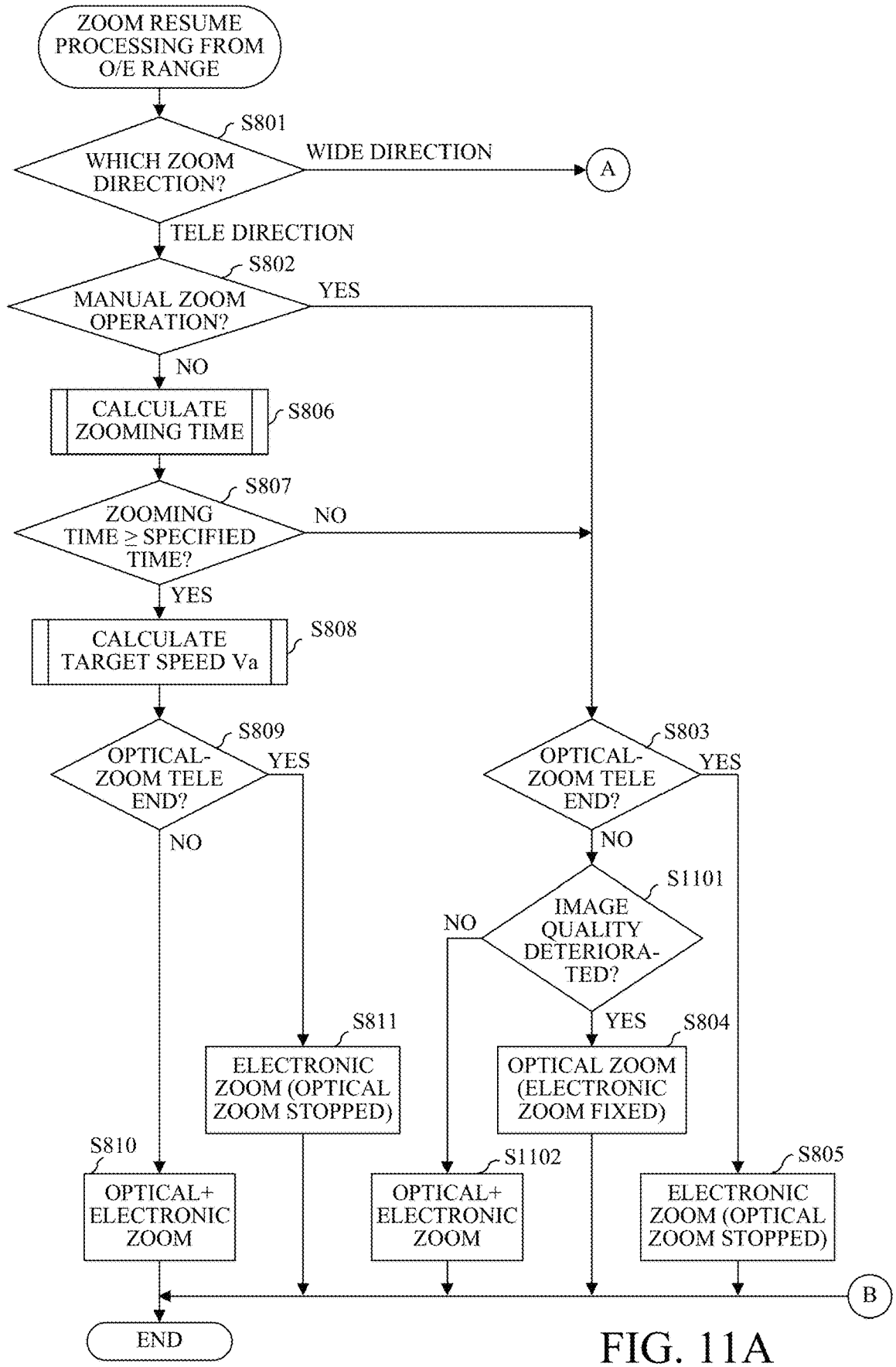
FIGS. 11A and 11B illustrate a flowchart of zoom start processing from an O/E range according to the third embodiment.
Figure 11B:
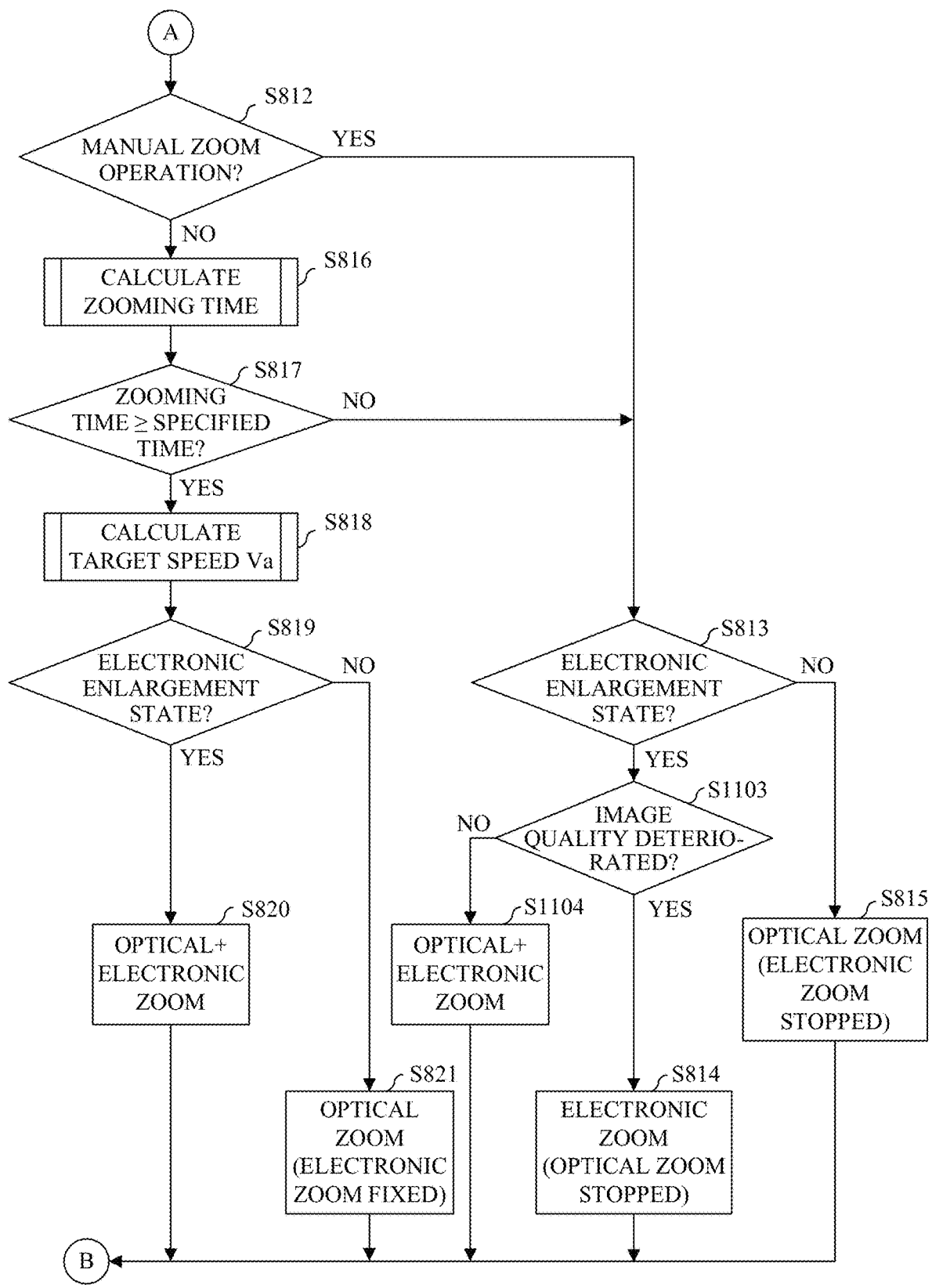

Referring now to FIGS. 11A and 11B, a description will be given of the O/E processing in the MPU 118 according to this embodiment. FIGS. 11A and 11B illustrate a flowchart of the zoom resume processing from the O/E range. This embodiment is implemented with the same configuration as that of the second embodiment. FIGS. 11A and 11B are obtained by adding steps S1101 to S1104 to the flowchart illustrated in FIGS. 8A and 8B.

In a case where zooming is resumed in the TELE direction based on the image quality priority from the O/E range in step S803, the MPU 118 determines in step S1101 whether the zooming causes image quality deterioration. In a case where it is determined that the zooming does not cause the image quality deterioration, the flow proceeds to step S1102, where MPU 118 resumes the zooming with O/E. In a case where the zooming is advanced and the zoom position reaches a range that causes the image quality deterioration, the flow proceeds to step S804, where the MPU 118 stops the electronic zoom and switches the electronic zoom to the optical zoom while maintaining the target speed Va.

On the other hand, in a case where zooming is resumed based on the image quality priority in the WIDE direction from the O/E range, in step S1103, the MPU 118 determines whether the zooming causes image quality deterioration. In a case where it is determined that the zooming does not cause the image quality deterioration, the flow proceeds to step S1104, where the MPU 118 resumes the zooming with the O/E. In a case where the zooming is advanced and the zoom position reaches a range that causes the image quality deterioration, the flow proceeds to step S814, and the MPU 118 stops the optical zoom and switches the optical zoom to the electronic zoom while maintaining the target speed Va.

This embodiment relates to a zoom resume method in a case where the time specified zoom is interrupted in the O/E range, and is applicable to a case where there is an O/E range that does not cause image quality deterioration in the second embodiment.

As described above, in each embodiment, the control unit 118c sets at least one of a start position and an end position of a first range in which the optical zoom and the electronic zoom are simultaneously performed based on a target zoom position and a specified zooming time specified by the user. The control unit 118c may set the first range in a case where a zooming time to the target zoom position by the optical zoom is longer than the specified zooming time. The control unit 118c may not set the first range in a case where a zoom position can reach the target zoom position only by optical zoom. The control unit 118c may not set the first range in a case where a zoom position can reach the target zoom position only by electronic zoom.

The control unit may set the first range between a second range for exclusive use of (dedicated for) the optical zoom and a third range for exclusive use of the electronic zoom. The control unit 118c may calculate the target speed Va based on the zoom moving amount to the target zoom position and the specified time, and set a zooming speed of each of the first range, the second range, and the third range to the target speed Va. The control unit 118c may calculate the target speed at a first timing before zooming is started. The control unit 118c may calculate a first target speed as the target speed at the first timing regardless of a zooming time and a driving amount in the acceleration period. The control unit 118c may calculate a second target speed at a second timing after the zoom is started and the target speed is acquired, based on the zooming time and driving amount in the acceleration period, and updates the target speed to the second target speed (corrects the zooming time in the acceleration period). The control unit 118c may set a zooming speed by the electronic zoom control unit 118b in the first range so as to correct a shift from the target speed of the zooming speed by the optical zoom control unit 118a.

The control unit 118c may determine whether to select time priority or image quality priority in resuming zooming after zooming is stopped in the first range. The control unit 118c may simultaneously perform the optical zoom and the electronic zoom when determining to select the time priority, and perform either the optical zoom or the electronic zoom when determining to select the image quality priority. The control unit 118c may determine to select the time priority in a case where a zooming time to the target zoom position is shorter than the specified zooming time. The control unit 118c may determine to select the image quality priority in a case where the specified zooming time has not yet been specified, or a zooming time to the target zoom position is longer than the specified zooming time.

When determining to select the image quality priority, the control unit 118c may perform the optical zoom in a case where a zooming direction is a first zooming direction in which the electronic zoom transfers from a first state to a second state, and performs the electronic zoom in a case where the zooming direction is a second zooming direction in which the electronic zoom transfers from the second state to the first state. The first zooming direction may be a zooming direction from a wide-angle side to a telephoto side, and the second zooming direction may be a zooming direction from the telephoto side to the wide-angle side.

The control unit 118c may determine whether image quality deteriorates in enlarging an image by the electronic zoom. When determining that the image quality deteriorates, the control unit 118c may simultaneously perform the optical zoom and the electronic zoom regardless of a determination result of whether to select the time priority or the image quality priority. The control unit 118c may determine to select the image quality priority during imaging, and determine to select the time priority during non-imaging.

Each embodiment can provide a control apparatus, an image pickup apparatus, a control method, and a storage medium, each of which can shorten the specified zooming time.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), microprocessing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-033774, filed on Mar. 4, 2022, which is hereby incorporated by reference herein in its entirety.

What is claimed is:

1. A control apparatus comprising at least one processor, and a memory coupled to the at least one processor, the memory having instructions that, when executed by the processor, perform operations as:
  an optical zoom control unit configured to control optical zoom;
  an electronic zoom control unit configured to control electronic zoom; and
  a main control unit configured to control the optical zoom control unit and the electronic zoom control unit,
  wherein the main control unit sets a first range in which the optical zoom and the electronic zoom are simultaneously performed between a second range for exclusive use of the optical zoom and a third range for exclusive use of the electronic zoom,
  wherein the main control unit changes at least one of a start position and an end position of the first range such that a ratio of a time corresponding to the first range with respect to a specified zooming time specified by a user changes according to a target zoom position and the specified zooming time specified by the user, wherein the main control unit determines whether to select time priority or image quality priority in resuming zooming after the zooming is stopped in the first range, wherein the main control unit simultaneously performs the optical zoom and the electronic zoom when determining to select the time priority, wherein the main control unit performs either the optical zoom or the electronic zoom when determining to select the image quality priority, and wherein the main control unit determines to select the time priority in a case where a zooming time to the target zoom position is shorter than the specified zooming time.

2. The control apparatus according to claim 1, wherein the main control unit sets the first range in a case where a zooming time to the target zoom position by the optical zoom is longer than the specified zooming time.

3. The control apparatus according to claim 1, wherein the main control unit does not set the first range in a case where a zoom position can reach the target zoom position only by the optical zoom in the specified zooming time.

4. The control apparatus according to claim 1, wherein the main control unit does not set the first range in a case where a zoom position can reach the target zoom position only by the electronic zoom.

5. The control apparatus according to claim 1, wherein the main control unit calculate a target speed based on a zoom moving amount to the target zoom position and the specified zooming time, and wherein the main control unit sets a zooming speed of each of the first range, the second range, and the third range to the target speed.

6. The control apparatus according to claim 5, wherein the main control unit calculates the target speed at a first timing before zooming is started.

7. The control apparatus according to claim 6, wherein the main control unit calculates a first target speed as the target speed at the first timing without considering a zooming time and a driving amount in an acceleration period, and wherein the main control unit calculates a second target speed at a second timing after the zooming is started and the target speed is acquired, based on the zooming time and the driving amount in the acceleration period, and updates the target speed to the second target speed.

8. The control apparatus according to claim 5, wherein the main control unit sets a zooming speed by the electronic zoom in the first range so as to correct a shift from the target speed of the zooming speed by the optical zoom.

9. The control apparatus according to claim 1, wherein the main control unit determines to select the image quality priority in a case where the specified zooming time has not yet been specified, or a zooming time to the target zoom position is longer than the specified zooming time.

10. The control apparatus according to claim 1, wherein the main control unit performs the optical zoom when determining to select the image quality priority in a case where a zooming direction is a first zooming direction in which the electronic zoom transfers from a first state to a second state, and wherein the main control unit performs the electronic zoom when determining to select the image quality priority in a case where the zooming direction is a second zooming direction in which the electronic zoom transfers from the second state to the first state.

11. The control apparatus according to claim 10, wherein the first zooming direction is a zooming direction from a wide-angle side to a telephoto side, and wherein the second zooming direction is a zooming direction from the telephoto side to the wide-angle side.

12. The control apparatus according to claim 1, wherein the main control unit determines whether image quality deteriorates in enlarging an image by the electronic zoom, and wherein the main control unit simultaneously performing the optical zoom and the electronic zoom when determining that the image quality deteriorates, regardless of a determination result of whether to select the time priority or the image quality priority.

13. The control apparatus according to claim 1, wherein the main control unit determines to select the image quality priority during imaging, and determines to select the time priority during non-imaging.

14. An image pickup apparatus comprising:
an image sensor;
a control apparatus,
wherein the control apparatus includes at least one processor, and a memory coupled to the at least one processor, the memory having instructions that, when executed by the processor, perform operations as:
an optical zoom control unit configured to perform optical zoom;
an electronic zoom control unit configured to perform electronic zoom; and
a main control unit configured to control the optical zoom control unit and the electronic zoom control unit,
wherein the main control unit sets a first range in which the optical zoom and the electronic zoom are simultaneously performed between a second range for exclusive use of the optical zoom and a third range for exclusive use of the electronic zoom,
wherein the main control unit changes at least one of a start position and an end position of the first range such that a ratio of a time corresponding to the first range with respect to a specified zooming time specified by a user changes according to a target zoom position and the specified zooming time specified by the user,
wherein the main control unit determines whether to select time priority or image quality priority in resuming zooming after the zooming is stopped in the first range,
wherein the main control unit simultaneously performs the optical zoom and the electronic zoom when determining to select the time priority,
wherein the main control unit performs either the optical zoom or the electronic zoom when determining to select the image quality priority, and
wherein the main control unit determines to select the time priority in a case where a zooming time to the target zoom position is shorter than the specified zooming time.

15. A control method configured to control an optical zoom and an electronic zoom, the control method comprising the steps of:
acquiring a target zoom position and a specified zooming time specified by a user; and
setting a first range in which the optical zoom and the electronic zoom are simultaneously performed between a second range for exclusive use of the optical zoom and a third range for exclusive use of the electronic zoom, wherein in setting the first range, at least one of a start position and an end position of the first range is changed such that a ratio of a time corresponding to the first range with respect to the specified zooming time specified by a user changes according to the target zoom position and the specified zooming time, and wherein the control method further comprises the steps of:

determining whether to select time priority or image quality priority in resuming zooming after the zooming is stopped in the first range, simultaneously performing the optical zoom and the electronic zoom when determining to select the time priority, performing either the optical zoom or the electronic zoom when determining to select the image quality priority, and determining to select the time priority in a case where a zooming time to the target zoom position is shorter than the specified zooming time.

16. A non-transitory computer-readable storage medium storing a program that causes a computer to execute the control method according to claim 15.

* * * * *